(12) United States Patent
Buretea et al.

(10) Patent No.: US 7,794,600 B1
(45) Date of Patent: Sep. 14, 2010

(54) PURIFICATION OF NANOCRYSTAL SOLUTIONS BY CHROMATOGRAPHY

(75) Inventors: Mihai A. Buretea, San Francisco, CA (US); Joel Gamoras, Vallejo, CA (US); Erik C. Scher, San Francisco, CA (US); Jeffery A. Whiteford, Belmont, CA (US)

(73) Assignee: Nanosys, Inc., Palo Alto, CA (US)

( * ) Notice: Subject to any disclaimer, the term of this patent is extended or adjusted under 35 U.S.C. 154(b) by 1367 days.

(21) Appl. No.: 11/212,488

(22) Filed: Aug. 25, 2005

Related U.S. Application Data

(60) Provisional application No. 60/604,837, filed on Aug. 27, 2004.

(51) Int. Cl.
*B01D 15/08* (2006.01)
(52) U.S. Cl. .......... 210/635; 23/299; 210/656; 210/703; 210/774; 210/806; 977/810; 977/840
(58) Field of Classification Search ........... 210/198.2, 210/635, 639, 656, 749, 806, 703, 774; 423/68, 423/70, 98, 658.5; 977/773, 778, 811, 813, 977/810, 840; 23/295 R, 299, 300; 428/402, 428/403, 411.1; 422/100, 101
See application file for complete search history.

(56) References Cited

U.S. PATENT DOCUMENTS

| | | | |
|---|---|---|---|
| 6,207,229 B1 | 3/2001 | Bawendi et al. | |
| 6,225,198 B1 | 5/2001 | Alivisatos et al. | |
| 6,251,303 B1 | 6/2001 | Bawendi et al. | |
| 6,306,736 B1 | 10/2001 | Alivisatos et al. | |
| 6,322,901 B1 | 11/2001 | Bawendi et al. | |
| 6,326,144 B1 | 12/2001 | Bawendi et al. | |
| 6,416,716 B1 * | 7/2002 | Shukla et al. | 422/101 |
| 6,440,213 B1 | 8/2002 | Alivisatos et al. | |

(Continued)

FOREIGN PATENT DOCUMENTS

| | | |
|---|---|---|
| WO | WO-03081683 | 10/2003 |
| WO | WO 2005022120 | 3/2005 |
| WO | WO-2005023923 | 3/2005 |

OTHER PUBLICATIONS

Duan, X. et al., "High-performance thin-film transistors using semiconductor nanowires and nanoribbongs" Nature, (2003) 425:274-278.

(Continued)

*Primary Examiner*—Joseph W Drodge
(74) *Attorney, Agent, or Firm*—Donna M. Fabian; Andrew L. Filler

(57) ABSTRACT

The present invention relates to a method of processing nanocrystals. The method comprises providing a mixture comprising nanocrystals, contaminants and a first solvent in which the nanocrystals are soluble, and using chromatography to reduce the amount of contaminants in the mixture. The method optionally comprises isolating the nanocrystals after chromatography. The method allows for the production of nanocrystal compositions having a total amount of surfactant associated therewith, the amount of surfactant comprising an amount of bound surfactant and an amount of free surfactant in the solvent, the amount of free surfactant being less than about 1% of the total amount of surfactant in the solvent. The present invention, accordingly, also relates to such compositions and corresponding composites of nanocrystals in organic polymer matrices.

37 Claims, 23 Drawing Sheets

U.S. PATENT DOCUMENTS

| | | | |
|---|---|---|---|
| 6,607,829 | B1 | 8/2003 | Bawendi et al. |
| 6,617,583 | B1 | 9/2003 | Bawendi et al. |
| 6,761,877 | B2 * | 7/2004 | Barbera-Guillem ......... 424/9.6 |
| 6,788,453 | B2 * | 9/2004 | Banin et al. ................. 359/342 |
| 6,878,871 | B2 | 4/2005 | Scher et al. |
| 6,949,206 | B2 * | 9/2005 | Whiteford et al. ........... 252/500 |
| 6,955,855 | B2 * | 10/2005 | Naasani ...................... 428/403 |
| 7,422,790 | B1 * | 9/2008 | Scher et al. ............. 428/411.1 |
| 2004/0095658 | A1 | 5/2004 | Buretea et al. |
| 2005/0129580 | A1 * | 6/2005 | Swinehart et al. ........... 422/100 |

OTHER PUBLICATIONS

Fischer, Ch.-H. et al. "Phogochemistry of colloidal semiconductors" Ber. Bunsenges. Phys. Chem. (1989) 93:61-64.

Ginger, D.S. e al., "Charge Separation in Conjugated-Polymer/Nanocrystal Blends" *Synthetic Metals* (1999) 101:425-428.

Ginger, D.S. et al., "Charge Injection and Transport in Fils of CdSe Nanocrystals" *J. Appl. Phys.* (2000) 87(3):1361-1368.

Greenham, N.C. et al., "Charge separation and transport in conjugated-polymer/semiconductor-nanocrystal composites studied by photoluminescence quenching and photoconductivity" Phys. Rev. B (1996) 54:17628-17635.

Huynh, W.U. et al., "CdSe nanocrystal rods/poly(3-hexylthiophene) composite photovoltaic devices" Adv. Mater. (1999) 11:923-927.

Khitrov, G.A.et al. "ZnS nanomaterial characterization of MALDI-TOF mass spectrometry" J. Am. Chem. Soc. (2003) 125:10465-10469.

Manna, L. et al., "Synthesis of soluble and processable rod-, arrow-, teardrop-, and tetrapod-shaped CdSe nanocrystals" J. Am. Chem. Soc. (2000) 122:12700-12706.

Manna, L. et al., "Epitaxial growth and photochemical annealing of graded CdS/ZnS sheels on colloidal CdSe nanorods" J. Am. Chem. Soc. (2002) 124:7136-7145.

Murray, C. B. et al., "Synthesis and characterization of nearly monodisperse CdE (E=S, Se, Te) semiconductor nanocrystals" J. Am. Chem. Soc. (1993) 115:8706-8715.

Pell, L. et al., "Optical properties of silicon nanocrystals synthesized in supercritical fluids" Proceedings of SPIE (2002) 4808:91-98.

Peng, X. et al., "Shape control of CdSe nanocrystals" Nature (2000) 404:59-61.

Peng, Z.A. et al., Nearly monodisperse and shapte-controlled CdSe nanocrystals via alternative routes: nucleation and growth J. Am. Chem. Soc. (2002) 124:3343-3353.

Puntes, V.F. et al., "Colloidal nanocrystal shape and size control: the case of cobalt" *Science* (2001) 291:2115-2117.

Rockenberger, J. et al., "A new nonhydrolytic single-precursor approach to surfactant-capped nanocrystals of transition metal oxides" *J. Am. Chem. Soc.* (1999) 121:11595-11596.

Wilcoxon, J.P., et al., "Liquid chromatographic analysis and characterization of inorganic nanoclusters" Nanostruct. Mater. (1997) 9:85-88.

Wilcoxon, J.P. et al. "Size distributions of gold nanoclusters studied by liquid chromatography" Langmuir (2000) 16:9912-9920.

Wilcoxon, J.P. et al. "Optical properties of gold and silver nanoclusters investigated by liquid chromatography" J. Chem. Phys. (2001) 115:998-1008.

\* cited by examiner

FIGS. 1A-E

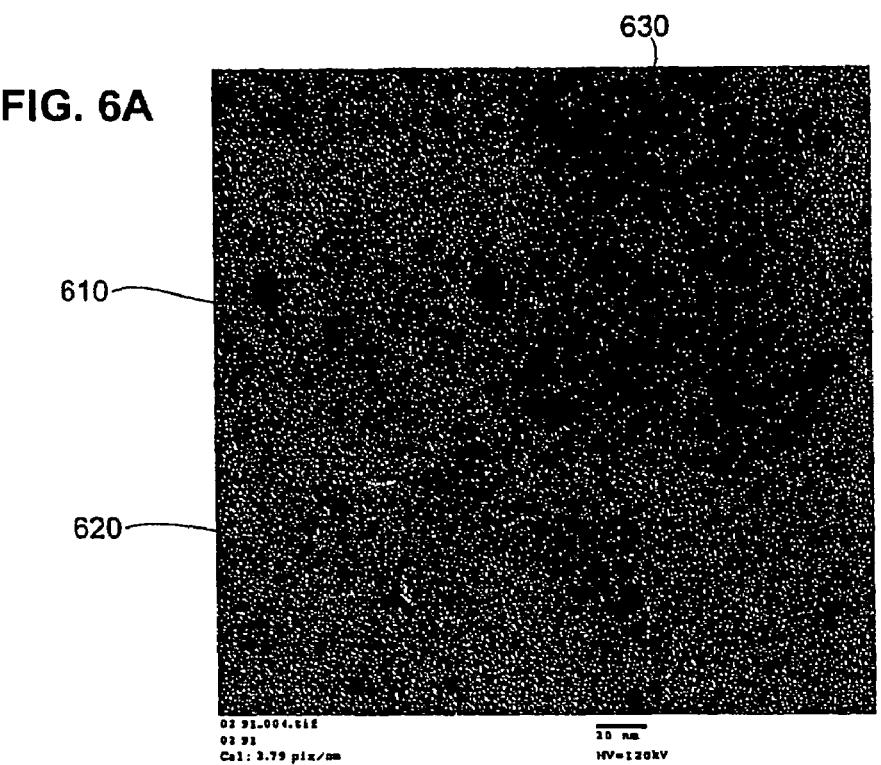
FIG. 6A
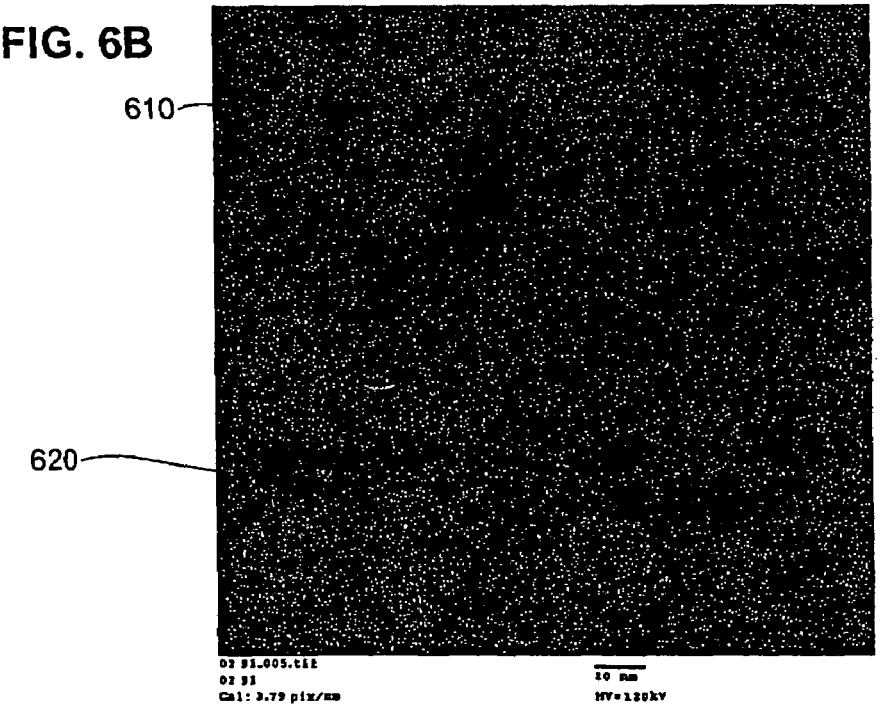
FIG. 6B
FIGs. 6A-6B

PURIFICATION OF NANOCRYSTAL SOLUTIONS BY CHROMATOGRAPHY

CROSS REFERENCE TO RELATED APPLICATIONS

This application claims the benefit of U.S. Provisional Patent Application No. 60/604,837, filed Aug. 27, 2004, which is incorporated by reference in its entirety herein.

BACKGROUND OF THE INVENTION

1. Field of the Invention

The present invention relates to the field of nanocrystals and to a method of processing and resulting compositions of same.

2. Related Art

The world of "Nanotechnology" has been simultaneously heralded by some who view its advances as providing the next great technological evolution, and derided by others who view it as just the latest buzz-word technology to attract venture capital investment. While their fundamental views on the promise of the technology are at odds, members of both camps will point to a number of common issues that nanotechnology must address if it is ever to fulfill its promises.

Of particular note is that, while both camps tend to acknowledge that nanomaterials often have unique and potentially valuable properties, e.g., structural, electrical, opto-electrical and thermoelectric, the ability of scientists and eventually users or consumers to access these unique and valuable properties can present a substantial hurdle to realizing the full benefits of these materials.

For example, nanocrystals have gained a great deal of attention for their interesting and novel properties in electrical, chemical, optical and other applications. Such nanomaterials have a wide variety of expected and actual applications, including use as semiconductors for nanoscale electronics, optoelectronic applications in emissive devices, e.g., nanolasers, LEDs, etc., photovoltaics, and sensor applications, e.g., as nanoChemFETS.

While commercial applications of the molecular, physical, chemical and optical properties of nanocrystals are beginning to be realized, it has been difficult to fully capitalize on the unique properties of nanocrystals because of the difficulties related to their preparation and processing. In order to incorporate the nanocrystals into devices, the nanocrystals must be further processed from the batch reaction mixtures. The batch reaction mixtures contain by-products, impurities, excess surfactant and other matter that must be separated from the nanocrystals during processing.

Methods of processing the nanocrystals traditionally have been based on the solubility differences between nanocrystals, the surfactants and other impurities or reaction by-products. Traditionally, solvents are added to the batch reaction mixture to cause the nanocrystals to precipitate, thus allowing for their isolation by filtration or centrifugation. The isolated nanocrystals are then redispersed in an appropriate solvent and the precipitation is repeated any number of times until the appropriate level of purity is obtained. When the solubility of the nanocrystals and the surfactant or other impurities are similar in a given solvent mixture, however, the process must be repeated a greater number of times to purify the nanocrystals. This increases the cost and difficulties associated with processing the nanocrystals.

It is unclear from the current state of the art whether other methods are preferable over the traditional precipitation methods. For example, Khitrov, G. A. and Strouse, G. F. *J. Am. Chem. Soc.* 125:10465-10469 (2003) describe a method of characterizing ZnS nanomaterials using MALDI-TOF mass spectrometry and teach that chromatographic methods of characterizing nanomaterials suffer from limitations such as sample retention. Also, Akcakir, O. in Silicon NanoCrystal Characterization by Fluorescence Correlation Spectroscopy (2001) (Ph.D. dissertation, University of Illinois), available at http://www.physics.uiuc.edu/Research/Publications/theses/copies/akcakir/chapter5.pdf. Akcakir teaches traditional techniques such as chromatography are not readily applicable to the study of nanomaterials. Ackakir teaches that because the nanoparticles are often compatible with both the liquid and solid phases characterization of sample quality may be difficult. Additionally, Krueger, K. M. teach that size exclusion chromatography of CdSe dots does not seem feasible (see, e.g., Krueger, K. M., Comments on CdSe Nanocrystal Research, available at http://nanonet.rice.edu/research/karl_res.html (Apr. 27, 2004)).

Despite the teachings of the above references, there has been limited success in the analytical characterization of certain types of nanomaterials using techniques such as liquid chromatography. For example, one group has shown that high performance liquid chromatography (HPLC) can be used to characterize size distributions of metallic nanoclusters (see, for example, Wilcoxon, J. P., et al., *Nanostruct. Mater.* 9:85-88 (1997); Wilcoxon, J. P. et al. *Langmuir* 16:9912-9920 (2000); and Wilcoxon, J. P. et al. *J. Chem. Phys.* 115:998-1008 (2001)). In one study, Wilcoxon et al. teach the eluent must be spiked with dodecane thiol, a ligand for the nanoclusters, to eliminate chemical interactions with the column (see Wilcoxon 2001 at 1000). This spiking of the eluent with ligand limits the utility of this method in processing nanomaterials because excess ligand is not desirable for most device applications. In addition, the ligand and nanomaterial (dodecane thiol and gold nanocluster) are readily separated using the traditional precipitation technique (see Wilcoxon 2000 at 9917).

Fischer, Ch.-H. et al. *Ber. Bunsenges. Phys. Chem.* 93:61-64 (1989) describe the fractionation of a colloid of CdS particles using size exclusion chromatography. However, in this study, the eluent contained both $Cd(ClO_4)_2$ and sodium hexametaphosphate as stabilizer for the particles. While this method was useful in characterizing size distributions of the particles, the method has almost no utility in purifying and processing nanomaterials. The eluent contains contaminants that would interfere with device fabrication and operation. In addition, the particles studied in Fischer are insoluble colloids.

Korgel, B. and Pell, L., *Proceedings of SPIE* 4808:91-98 (2002) teach a method of synthesizing and characterizing silicon nanocrystals. Korgel teaches the use of size exclusion chromatography to purify analytical quantities of nanocrystals from by-products with moderate size separation. However, in this method, Korgel does not teach the use of chromatography to remove excess ligand or surfactant. Furthermore, the ligand/surfactant, 1-octane thiol, is readily separated from the reaction mixture using traditional precipitation techniques. In addition, the method of Korgel is performed in air, which would not be applicable to air sensitive nanomaterials.

Accordingly, it would be desirable to have a method of processing a variety of different types of nanocrystals that is not based on their precipitation from solvents. Also, it would be desirable to have a method of processing nanocrystals that separates similarly soluble surfactants and ligands from the nanocrystals. Furthermore, some soluble nanocrystal populations cannot be made to precipitate using standard methods and solvents. Precipitation methods are inadequate for the purification of such nanocrystals.

SUMMARY OF THE INVENTION

The present invention relates to a method of processing nanocrystals. One aspect the method comprises providing a mixture comprising nanocrystals, contaminants, and a first solvent in which the nanocrystals are soluble, and using chromatography to reduce the amount of contaminants in the mixture. Optionally, the method comprises isolating the nanocrystals after the step of using chromatography. The present invention relates to methods of processing any nanocrystals. Alternatively, in one aspect, the invention relates to the processing of Group II-VI, Group III-V or Group IV-VI semiconductor nanocrystals, metal nanocrystals and insulator nanocrystals.

The present invention provides methods of reducing any type of contaminant present in the mixture comprising the nanocrystals. In one aspect, the contaminants comprise a surfactant. Optionally, the contaminants further comprise one or more catalysts, nanocrystal precursor, coordinating solvent, nanocrystal synthesis reaction by-products, or other impurities. Other impurities can arise from unknown impurities from starting materials, or those impurities that arise during the fabrication or processing of mixtures comprising nanocrystals. The methods allow for reducing the amount of free excess surfactant and nanocrystal bound surfactant in a mixture comprising nanocrystals. The methods are particularly useful in reducing the amount of free and bound excess surfactant when the surfactant and the nanocrystals have similar or about equal solubility in a given solvent system. The methods allow for the reduction of excess free surfactant and nanocrystal bound surfactant, while maintaining nanocrystal solubility and processibility.

Nanocrystal populations generally have a given size distribution. In another aspect, the present invention allows for the processing of a nanocrystal population having a first size distribution, comprising using chromatography to give a processed nanocrystal population having a second size distribution, wherein the second distribution is more narrow than the first distribution. Alternatively, the methods of the present invention allow for the separation of nanocrystals by size using chromatography.

The mixtures comprising nanocrystals and contaminants can be processed by chromatography and other methods of processing nanocrystal populations, e.g., precipitation. For example, in yet another aspect, before chromatography, the mixtures comprising the nanocrystals and contaminants are contacted with a solvent mixture of higher polarity to form a solvent mixture in which the nanocrystals are not soluble. The nanocrystals can then be isolated by centrifugation, filtration, or the like, optionally redissolved in a suitable solvent, and optionally further processed, e.g., in chromatography steps or additional precipitation and redissolving steps. Alternatively, the precipitation steps are performed after chromatography steps. The precipitation steps can be performed any number of successive times, for example, 2 to 6 times.

Additionally, in yet another aspect, the methods of the present invention allow for the further processing of nanocrystal populations to remove or limit the amount of surfactant bound to the nanocrystal. For example, chromatography is used to reduce the amount of excess bound surfactant, or alternatively, chromatography and additional further processing steps are used to reduce the amount of excess bound surfactant. For example, after chromatography, a mixture comprising nanocrystals having a first amount of bound acidic surfactant is contacted with a base to form an insoluble salt between the base and bound surfactant and the salt is separated from the mixture. After the separating step, the nanocrystals comprise from about a partial monolayer to a bilayer of bound surfactant.

Using the methods of the present invention, mixtures comprising nanocrystals and contaminants are processed until the amount of free surfactant in the mixture is about 10% to about 0.1% of the total amount of surfactant (bound plus free surfactant) in the mixture. Alternatively, the mixtures are processed according to the present invention until the nanocrystals comprise about a partial monolayer to a bilayer of bound surfactant.

In yet another aspect, the present invention relates to a composition, comprising a population of nanocrystals dissolved in a solvent; and wherein the nanocrystals have a total amount of surfactant associated therewith, the amount of surfactant comprising an amount of bound surfactant and an amount of free surfactant in the solvent, the amount of free surfactant being less than about 1% of the total amount of surfactant. The present invention also relates to a composite, comprising an organic polymer matrix; and a population of nanocrystals comprising less than a bilayer of surfactant associated therewith disposed within the organic polymer matrix.

It is to be understood that both the foregoing general description and the following detailed description are exemplary and explanatory and are intended to provide further explanation of the invention as claimed.

BRIEF DESCRIPTION OF THE FIGURES

The accompanying drawings, which are included to illustrate exemplary embodiments of the invention and are incorporated in and constitute a part of this specification, illustrate embodiments of the invention and together with the description serve to explain the principles of the invention. In the drawings:

FIGS. 6A-B are Transmission Electron Microscopy (TEM) micrographs taken of a mixture comprising nanocrystals and contaminants such as excess surfactant.

Figure 1A:
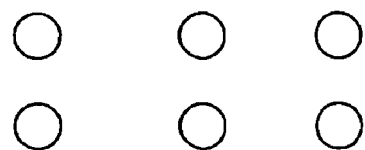
FIG. 1A illustrates nanocrystal spheres or dots that can be processed in accordance with the methods of the present invention.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Reference will now be made in detail to the embodiments of the present invention, examples of which are illustrated in the accompanying drawings.

Nanocrystal Synthesis

Semiconductor nanocrystals, their synthesis and their applications have previously been described in great detail. See, e.g., U.S. Pat. Nos. 6,322,901, 6,207,229, 6,607,829, 6,617,583, 6,326,144, 6,225,198, 6,306,736, and WO 2005/022120, each of which is hereby incorporated herein by reference in its entirety for all purposes.

As used herein, nanocrystals include a wide range of different materials that exist as particles having at least one cross sectional dimension of less than about 500 nm, and preferably, less than 100 nm. Examples of the nanoparticles include but are not limited to Group II-VI, Group III-V and Group IV-VI semiconductor nanocrystals, metal nanocrystals and insulator nanocrystals. Examples of Group II-VI or III-V nanocrystals include: any combination of an element from Group II, such as Zn, Cd and Hg, with any element from Group VI, such as S, Se, Te, Po, of the Periodic Table; and any combination of an element from Group III, such as B, Al, Ga, In, and Tl, with any element from Group V, such as N, P, As, Sb and Bi, of the Periodic Table. Specific examples include, but are not limited to ZnS, ZnSe, ZnTe, CdS, CdSe, CdTe, GaN, GaP, GaAs, InN, InP and InAs nanocrystals. Examples of Group IV-VI nanocrystals include any combination of an element from Group IV, such as Si, Ge, Sn and Pb, with an element from Group VI of the Periodic Table. Specific examples include, but are not limited to PbS, PbSe and PbTe. Specific examples of metal nanocrystals include but are not limited to Ni, Pd, Pt, Co, Cu, Ag, Au, Zn, Cd, Hg and Fe nanocrystals. Specific examples of insulator nanocrystals include, but are not limited to silica (e.g., $SiO_2$) and $GeO_2$.

Figure 1B:
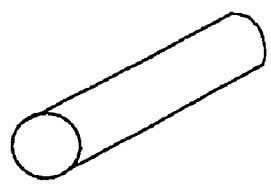
FIG. 1B illustrates a nanocrystal rod that can be processed in accordance with the methods of the present invention.
Figure 1C:
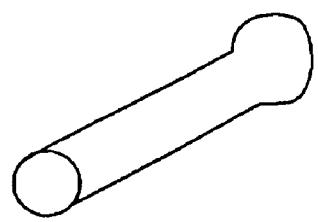
FIG. 1C illustrates a nanocrystal arrowhead that can be processed in accordance with the methods of the present invention.
Figure 1D:
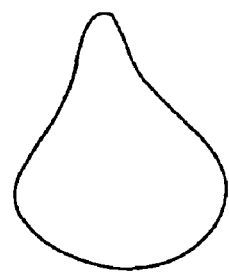
FIG. 1D illustrates a nanocrystal teardrop that can be processed in accordance with the methods of the present invention.
Figure 1E:
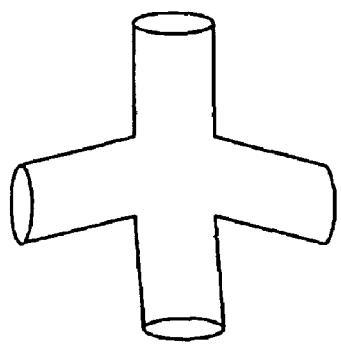
FIG. 1E illustrates a nanocrystal tetrapod that can be processed in accordance with the methods of the present invention.

The methods of the present invention can be applied to nanocrystals of any shape. The shape and size of nanocrystals can be controlled by using solution based processes that rely upon surfactant mediated growth. Specific examples of nanocrystal shapes include, but are not limited to, dots and spheres, rods and nanowires having length to width ratios of 2, 5, 10 or even 20 or more, rice, arrowheads, teardrops and tetrapods. FIGS. 1A-1E illustrate some specific examples of nanocrystal shapes. FIG. 1A illustrates nanocrystal spheres, FIG. 1B illustrates a nanocrystal rod, FIG. 1C illustrates a nanocrystal arrowhead, FIG. 1D illustrates a nanocrystal teardrop and FIG. 1E illustrates a nanocrystal tetrapod. See, e.g., U.S. Pat. No. 6,322,901; Peng et al., Nature 404:59-61 (2000); Manna et al., J. Am. Chem. Soc. 122:12700-12706 (2000); Manna et al., J. Am. Chem. Soc. 124:7136-7145 (2002); Duan et al., Nature, 425:274-278 (2003), each of which is incorporated herein by reference in its entirety for all purposes.

In the present invention, nanocrystals may comprise a single homogeneous composition or may comprise heterostructures, e.g., core-shell architectures where the core material is a first composition and the shell material is a second, different material that interface at a defined boundary or gradient. Additionally, the nanocrystals in a population may be of variable size, or they may be monodisperse in terms of one or more of their cross-sectional dimensions. Likewise, a population of nanocrystals may comprise a single type of nanocrystal, e.g., where substantially every member of the population is of a similar make-up, e.g., homo or heterostructure, or the population may be a heterogeneous mixture of different crystal types.

Figure 2:
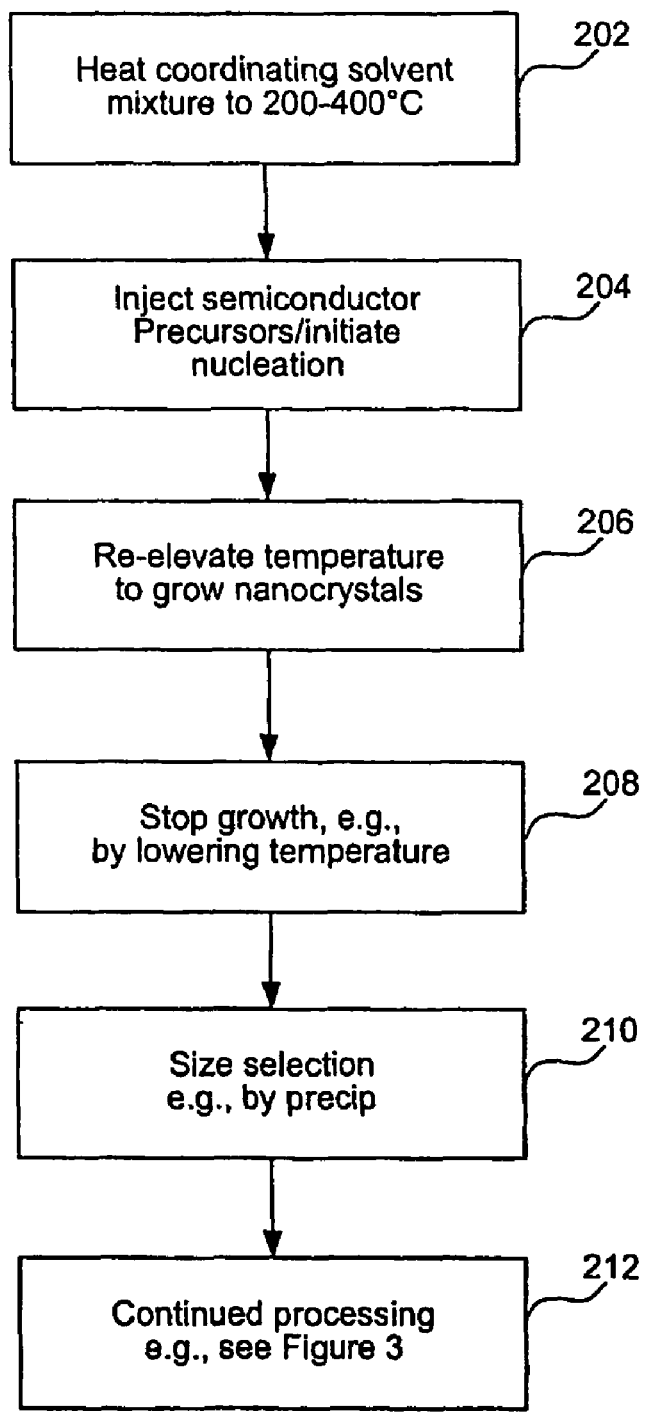
FIG. 2 is a flowchart depicting a synthetic route to fabricating nanocrystals in accordance with the present invention.

FIG. 2 provides a flow chart that illustrates the steps of an exemplary nanocrystal synthesis process. Semiconductor nanocrystals are typically synthesized by introducing semiconductor precursors, 204, e.g., a Group II precursor and a Group VI precursor, into a high temperature binary or coordinating solvent mixture, 202, e.g., that has a boiling point above a temperature at which the precursors will react, i.e., between 200 and 400° C. Typically, such binary solvent mixture includes at least two organic surfactants. Such surfactants typically include, e.g., trioctylphosphine oxide (TOPO) and either hexylphosphonic acid (HPA) or tetradecylphosphonic acid (TDPA), or the combination of TOPO and either octadecylphosphonic acid (ODPA) or hexadecylphosphonic acid (HDPA). Injection, 204, of the precursors into the hot reaction solvent mixture results in a short burst of homogeneous nucleation of nanocrystals. The rapid reduction of reagents associated with the nucleation, as well as the drop in temperature as a result of the addition of reagents effectively stops nucleation. Heating of the reaction mixture, 206, then permits annealing and growth of nanocrystallites as a substantially monodisperse particle size population. The growth process is then stopped, 208, by reducing the temperature of the reaction mixture. Further refining of size distribution of the particles can optionally be accomplished by size selective precipitation, 210, of the nanocrystals from the solvent mixture using, e.g., low molecular weight alcohols to change the polarity of the reaction mixture and thus precipitate out nanocrystals, or by other processing methods. The resulting nanocrystals are then subject to further processing steps 212.

Nanocrystal Processing

The present invention is generally directed to methods of processing nanocrystal populations, nanocrystal composites and the resulting compositions of nanocrystals. Populations of nanocrystals and nanocrystal composites processed according to the invention provide enhanced performance characteristics and/or are more easily integrated into device applications.

In one embodiment, therefore, the present invention relates to a method of processing nanocrystals, comprising providing a mixture comprising nanocrystals, contaminants, and a first solvent in which the nanocrystals are soluble. Then, chromatography is used to reduce the amount of contaminants in the mixture. The nanocrystals processed in accordance with the methods described herein are then readily integrated into matrices including organic polymer matrices, matrices that include other nanocrystals of the same or differing composition, sol-gel matrices, ceramic matrices, inorganic matrices, liquid crystal matrices, and the like.

One of the constant difficulties associated with truly exploiting the beneficial properties of nanomaterials has been the ability to effectively integrate those materials into their ultimate application. On a pure structural basis, positioning and orientation of nanomaterials must be practiced either on a bulk basis, or using self alignment, positioning or alignment techniques that exploit, e.g., chemical, energetic or magnetic properties of the nanomaterials. For other applications where structural integration is not as critical, e.g., in bulk applications of nanomaterials, issues of integration still may be prominent. For example, where one is utilizing nanomaterials as a bulk material, but exploiting their optical or electrical properties, it may be critical that one has properly integrated those materials into whatever matrix or upon whatever substrate is selected as optimal for a given application. Such proper integration can make the difference between efficiently exploiting the properties of the nanomaterials and wasting those properties.

In at least one example, it is believed that the extraction of electrical energy, e.g., in the form of separated charges, from nanomaterials is significantly impacted by the chemical integration of the nanomaterials with their surroundings into which the electrical energy is to be transported. Of particular interest is the transfer of charge into or out of the nanocrystals from or to a charge conducting matrix, as used in nanocrystal based opto-electrical devices such as photovoltaics. In particular, nanocrystals have been used and proposed for use as charge separation components for a number of applications including photovoltaic devices. Briefly, when light impinges upon a nanocrystal an electron hole pair or "exciton" is created within the crystal. When allowed to recombine within the crystal, the exciton emits light of a wavelength that is characteristic of the size and composition of the crystal. Alternatively, when the electron (or hole) is successfully extracted from the crystal and conducted to one of a pair of opposing electrodes, an electrical potential is created that can be exploited.

This property is the fundamental basis for the use of nanocrystal compositions in the next generation of photovoltaic cells. Specifically, these materials can be provided in flexible composites, which can potentially be manufactured at low cost. The nanocrystal materials also have relatively high theoretical conversion efficiencies and tunability. There is an expectation, therefore, that nanocrystal based photovoltaic devices may revolutionize energy generation.

Despite the expectations and early successes for photovoltaics utilizing nanocrystals as the active component, there exists substantial room for improvement. Specifically, further development of these materials is needed to achieve results near the theoretical efficiencies. Without being bound to a particular theory of operation, it is believed that at least a portion of the efficiency losses seen to date in prototype systems stems from poor connection of one of the charge carriers, e.g., an electron conducting nanocrystal component, to the other charge carrier, e.g., a hole conducting surrounding matrix, whether that be an organic conducting polymer matrix or adjacent nanocrystals of a different composition. It is believed that this poor connection results in incomplete charge extraction and separation from the nanocrystals, which, in turn, is believed to be at least one cause of the lower than theoretical efficiencies.

Nanocrystals are also being developed as emitting components in light-emitting diodes (LED). Without being bound to a particular theory of operation, it is believed that in the case of LEDs, like photovoltaics, a portion of the efficiency losses are due to the poor electrical connections between the nanocrystals and their surrounding matrix. Specifically, it is believed that incomplete charge combination and injection into the nanocrystals from the surrounding matrix is one cause of lower than theoretical efficiencies in LEDs. Therefore, the reduction of contaminants or excess surfactant in nanocrystal solutions or composites could improve the electrical connectivity and the device efficiency.

Accordingly, in at least one aspect, the invention provides for the processing of the nanocrystals to reduce excess levels of contaminants that interfere with this connection. One example of such a contaminant includes the surfactants that are used in the synthesis of the nanocrystals and/or that are used to improve the handling characteristics of the nanocrystals, e.g., their solubility. In particular, without being bound to a particular theory of operation, it is believed that the above-mentioned surfactants provide a barrier layer that interferes with charge transfer between the nanocrystal component and its surrounding matrix. Unfortunately, however, some level of surfactant is required in order to provide for reasonable handling of the nanocrystal component. Specifically, if the nanocrystal is insufficiently coated with surfactant, then it will aggregate with other nanocrystals rather than yielding good dispersion in its ultimate matrix, which will lead to inefficient charge extraction, and even non-functioning composite matrices.

Surfactant is used herein to refer to molecules that interact dynamically with the surface of a nanocrystal. The term surfactant is also understood to include one type of surfactant or two or more different types of surfactants. A surfactant is understood to act dynamically with a nanocrystal surface if the surfactant is capable of removing and/or adding molecules to the nanocrystal during nanocrystal synthesis, or alternatively, if the surfactant is capable of adhering, adsorbing or binding to the nanocrystal surface. Examples include, but are not limited to, alkylcarboxylic acids, alkylamines, alkylamine oxides, sulphonates, sulphonic acids, sulphinic acids, phosphonates, phosphonic acids, phosphinic acids, phosphine oxides and polymers thereof. Specific examples include hexylphosphonic acid, octylphosphonic acid, decylphosphonic acid, dodecylphosphonic acid and phosphonate esters and polymers of the phosphonic acids, including dimers, trimers, tetramers, pentamers, hexamers, heptamers, etc. of the phosphonic acid.

The type of surfactant used in a given application depends on a number of factors. These factors include the polarity of the surfactant and how strongly the surfactant binds to the nanocrystal surface. Other factors include the boiling temperature and the thermal stability of the surfactant. Nanocrystal synthesis is typically performed at elevated temperatures, which requires surfactants that are stable up to 500° C. or higher. Surfactants are also chosen based on their ability to influence the optical, electrical or magnetic properties of the nanocrystal. For example, in applications that utilize nanocrystals as photo-emitters, while not intending to be bound to any particular theory, the band-edge emission competes with radiative and non-radiative decay, arising from surface electronic states. The surfactant can limit these non-emissive decay processes and enhance the emissive characteristics of the nanocrystal (Manna et al. *J. Am. Chem. Soc.* 124:7136-7145 (2002)). In addition, other factors include availability and cost of a surfactant.

In one example, one surfactant for the synthesis of Group II-VI nanocrystals, such as CdSe nanocrystals, is trioctylphosphine oxide (($C_8H_{17})_3PO$) (TOPO). The surfactant allows for the synthesis of CdSe nanocrystals in different shapes, such as spherical dots or rods, is readily available, renders the nanocrystal soluble in nonpolar solvents such as toluene and is thermally stable during the nanocrystal synthesis. In some nanocrystal synthesis methods, reaction temperatures nearing 500° C. are required, and therefore, surfactants with higher boiling points and increased thermal stability over TOPO are required. For example, one surfactant for the synthesis of certain Group III-V nanocrystals, such as InP nanocrystals, is trihexadecylphosphine oxide (($C_{16}H_{33})_3PO$). The surfactant allows for the production of a variety of types of InP nanocrystals, renders them soluble and processible in a variety of solvents and matrices and is thermally stable to higher temperatures than TOPO.

It is a goal of the present invention to provide a nanocrystal population that possesses sufficient surfactant coating to permit the solubility of the nanocrystal, but not so much that it interferes with device operation. As used herein, the concept of solubility as it is applied to nanocrystal populations generally envisions nanocrystals that are able to exist in solution in a substantially non-aggregated state, e.g., over 70%, 80% or 90% of the nanocrystals in a given population are not aggregated with any other nanocrystals in the same population, preferably greater than 95% are non-aggregated, and more preferably greater than 99% are non-aggregated. Again without being bound to a particular theory of operation, it is believed that such coating requires the presence of sufficient surfactant to provide from a partial monolayer on the nanocrystals to upwards of a bi-layer or even multilayer of surfactant coating a nanocrystal. Often, however, more surfactant is used during the nanocrystal synthesis than is required to render the nanocrystal soluble. Post-synthetic batch reaction mixtures, therefore, comprise the fabricated soluble nanocrystals and excess free surfactant, which is not bound to the nanocrystal.

In addition to excess free surfactant, batch reaction mixtures often comprise other contaminants that affect nanocrystal processing and device fabrication and operation. As discussed above, in some cases, the contaminants have adverse affects on device operation. In such cases, it is desirable to reduce or separate the contaminants from the nanocrystals while maintaining nanocrystal solubility. The term contaminants is used herein to refer to any organic or inorganic matter that is free or bound to the nanocrystal. Bound is used herein to refer to an association between the contaminant and nanocrystal through covalent attachment and non-covalent associations, such as ionic and electrostatic interactions, hydrogen bonding, van der Waals, hydrophobic/hydrophilic interactions, and the like. The term contaminants includes, but is not limited to, surfactants or ligands, coordinating solvents, nanocrystal precursors, catalysts, reaction by-products and impurities.

Specific examples of coordinating solvents include, but are not limited to trioctylamine, trihexylphosphine, trihexylphosphine oxide, trioctylphosphine, trioctylphosphine oxide, tridecylphosphine, tridecylphosphine oxide, tridodecylphosphine, tridodecylphosphine oxide, tritetradecylphosphine, tritetradecylphosphine oxide, trihexadecylphosphine, trihexadecylphosphine oxide, and trioctadecylphosphine, trioctadecyl-phosphine oxide and combinations thereof. In some cases, the surfactant and coordinating solvent are the same.

Specific examples of nanocrystal precursors include, but are not limited to metal oxides, metal salts, organometallic complexes and combinations thereof. In the case of Group II-VI or Group III-V nanocrystals, the precursors comprise a Group II or Group III element, e.g., CdO, $In_2O_3$, $CdCl_2$, $InCl_3$, dimethylcadmium, trimethylindium, and the like.

Specific examples of metal catalysts include but are not limited to colloidal metal particles that facilitate the anisotropic growth of nanocrystals, e.g. gold, silver and platinum colloidal particles and combinations thereof.

Reaction by-products include materials produced during the preparation of nanocrystal populations through side reactions, decomposition reactions, or some other known or unknown processes. Specific examples of reaction by-products include, but are not limited to products produced by the condensation or polycondensation of phosphonic acids.

Thus, in at least one aspect, the present invention provides methods and resulting compositions for processing nanocrystal populations to remove excess contaminants, and particularly the surfactants used in producing or solubilizing those populations of nanocrystals, so as to provide good interaction between the nanocrystals in the population and their surroundings, both in terms of charge extraction and physical interactions, e.g., solubility. For ease of discussion, the exemplary system is described in terms of a population of nanocrystals disposed in a matrix, e.g., a conducting polymer matrix, to form a composite material. However, it will be readily appreciated that the invention has broad applicability to situations where it is desired to improve the interaction between nanocrystals and whatever material surrounds them, including e.g., other nanocrystals, aqueous materials, solids, e.g., substrates, insulators, or the like. For example, it will be readily appreciated that a wide variety of opto-electronic and/or luminescent applications of nanocrystals operate on the same fundamental principles of charge injection or extraction that would benefit from enhanced charge transfer between matrix and nanocrystal, e.g., nanocrystal based light-emitting diodes (LEDs), etc.

In general, the present invention provides methods for reducing the level of excess surfactant and other contaminants in a mixture comprising a nanocrystal population by one or both of reducing excess unbound or free surfactant and other free contaminants and also reducing excess levels of surfactant or other contaminants that may be associated with the nanocrystals. Surfactant which is associated with the nanocrystals is generally referred to herein as bound surfactant despite the nature of the association. In some cases, multiple layers of bound surfactant are present on the nanocrystals. The outer layers of surfactant may impede device operation, while not improving the processing of the nanocrystals over a single layer. In these cases, it is desirable to reduce the amount of bound surfactant during nanocrystal processing so that only a single layer of bound surfactant remains. In general, the goals of the invention are achieved, respectively, by using chromatography to reduce excess unbound or free surfactant, other contaminants and the excess associated or bound surfactant.

While prior researchers have discussed washing procedures for processing nanocrystals (see, e.g., Huynh et al., *Adv. Mater.* 11:923-927 (1999); and Greenham, et al., *Phys. Rev. B* 54:17628-17635 (1996)), such procedures have resulted in nanocrystals that have relatively high levels of contaminating surfactant, both bound and free. Without being bound to a particular theory of operation, it is believed that this excess level of contamination is at least partially responsible for the lackluster performance of electrical or opto-electrical devices based upon these materials, relative to their theoretical potentials. Further, these earlier references specifically disclose the necessity of avoiding additional washing steps by suggesting that further washing steps will reduce the solubility of the overall nanocrystal component, and thus reduce its integratability. Additionally, while discussing washing procedures, by and large, such washing has simply focused upon washing and rewashing precipitated nanocrystals to remove any residual free materials from those precipitated crystals. Such iterative washing and rewashing processes tend to re-precipitate and re-suspend the same contaminants.

An additional problem arises when the solubility of the surfactant or other contaminants is similar or equal to that of the nanocrystal population in any given solvent. One example is in the processing of InP nanocrystalline dots and spheres, synthesized using trihexadecylphosphine oxide as surfactant. As the polarity of a given solvent system is changed, the excess surfactant precipitates out with the nanocrystal, making separation based on solubility differences impossible. In these cases, the previous precipitation and washing methods taught in the art are of no use to processing and purifying nanocrystal populations. In addition, while researchers have attempted to develop methods of characterizing nanocrystal populations using other techniques, such as liquid chromatography, the methods are of no use to reducing the amount of excess surfactant in the nanocrystal populations. The earlier references have taught the eluent should be spiked with stabilizer or surfactant to make the technique operable (see, e.g., Wilcoxon, J. P. et al. *J. Chem. Phys.* 115:998-1008 (2001) and Fischer, Ch.-H. et al. *Ber. Bunsenges. Phys. Chem.* 93:61-64 (1989)). These teachings directly contradict the purpose of using chromatography for processing and purifying nanocrystals, that is, to limit and reduce, not increase, the amount of excess surfactant.

Furthermore, traditional chromatography techniques have been used to characterize and study purity of organic molecules. In particular, size exclusion chromatography (SEC) is routinely used to characterize molecular weight distributions of organic polymers. On the contrary, the present invention provides methods of separating inorganic nanocrystals from organic contaminants using chromatography, without the need of spiking the eluents with additional surfactant, while maintaining the solubility and processibility of the inorganic nanocrystals. The present invention, also to the contrary of earlier teachings, allows for the processing of large quantities of nanocrystals. The methods of the present invention can be included in manufacturing processes to allow for the production of large quantities of purified and processible nanocrystals.

Figure 3:
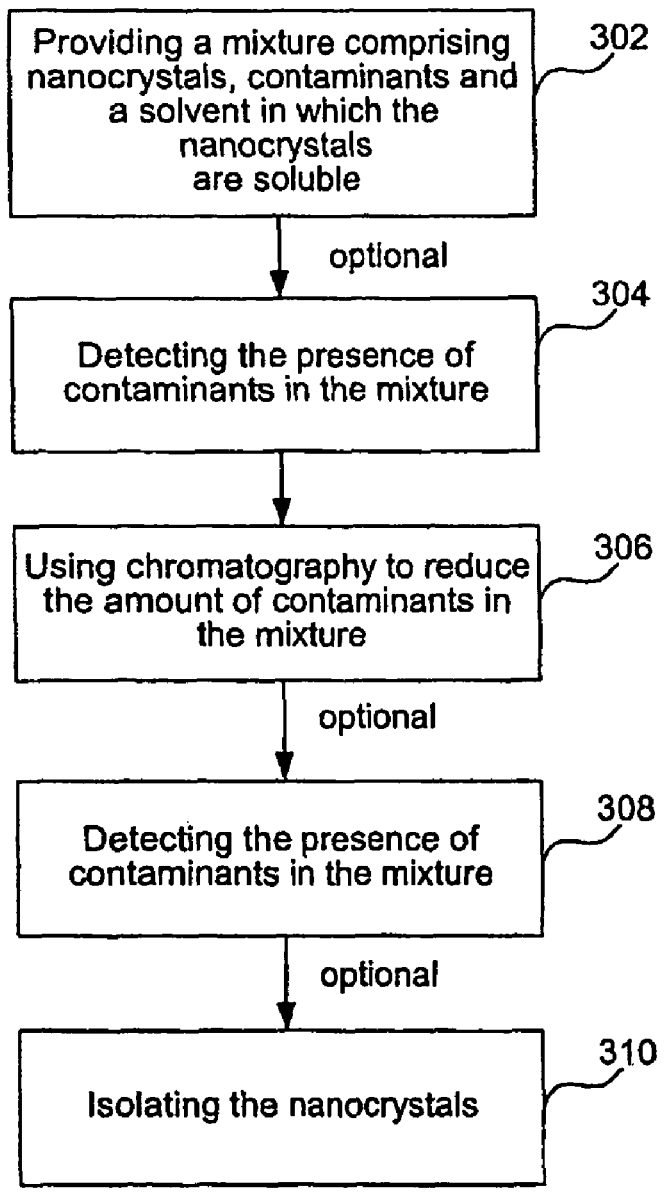
FIG. 3 is a flowchart depicting the processing of nanocrystals using chromatography in accordance with the present invention.

Accordingly, FIG. 3 illustrates one aspect of the present invention, which is a method comprising first providing a mixture comprising nanocrystals, contaminants and a solvent in which the nanocrystals are soluble, as illustrated at a step 302. Mixtures comprising nanocrystals are provided from any source. For example, the mixture is provided directly from the raw post-synthesis batch reaction mixtures. In another example, the mixture is provided from a composition of nanocrystals that have already been partially processed. Examples of a partial processing step include, but are not limited to washing, extracting, precipitating, centrifuging and filtering the post-synthetic batch reaction mixture. Second, referring back to FIG. 3, the amount or level of contaminants is optionally detected in the mixture, at a step 304. Any method known to one of ordinary skill in the art can be used to detect the amount of contaminants. For example, chromatographic techniques using refractive index or ultraviolet detectors can be used. Other methods of detection include, but are not limited to Nuclear Magnetic Resonance (NMR) spectroscopy, mass spectrometry, optical spectroscopy and Transmission Electron Microscopy (TEM).

Figure 4:
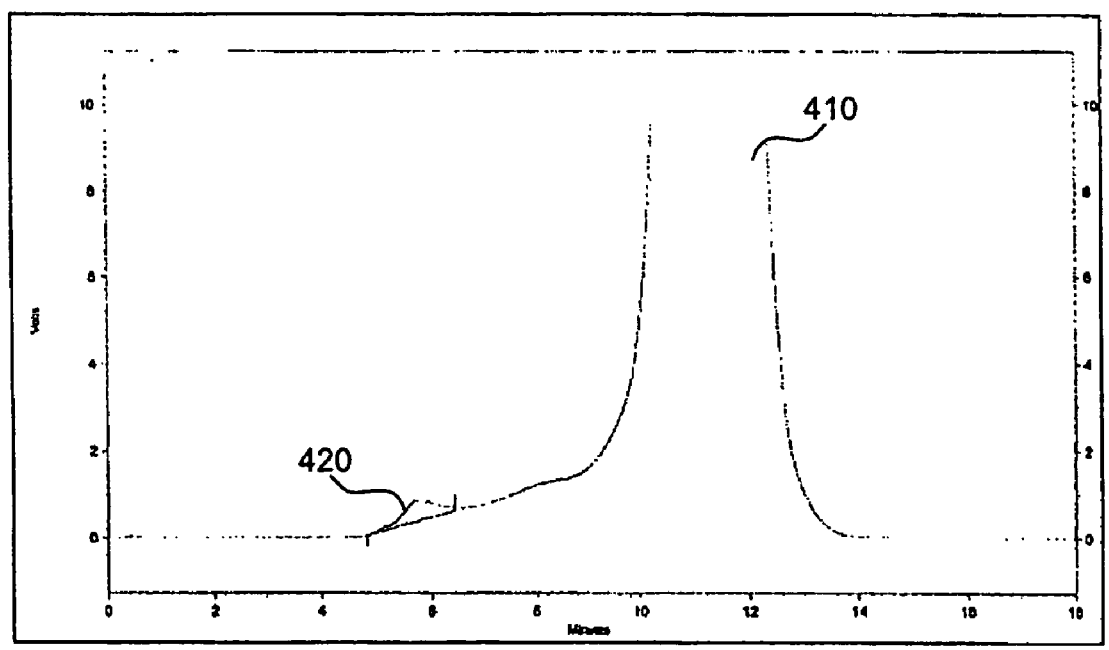
FIG. 4 is a Size Exclusion Chromatography (SEC) chromatogram of a mixture of nanocrystals and contaminants processed in accordance with the present invention.

FIG. 4 illustrates the results of a first method of detecting contaminants in mixtures comprising nanocrystals in accordance with the present invention, as a plot of detector response versus time using size exclusion chromatography (SEC). The excess organic contaminants, identified at region 410, and soluble nanocrystals, at region 420, are separately detected using chloroform eluent at a flow rate of 1 mL/min and a UV absorbance detector set at 254 nm.

Figure 5:
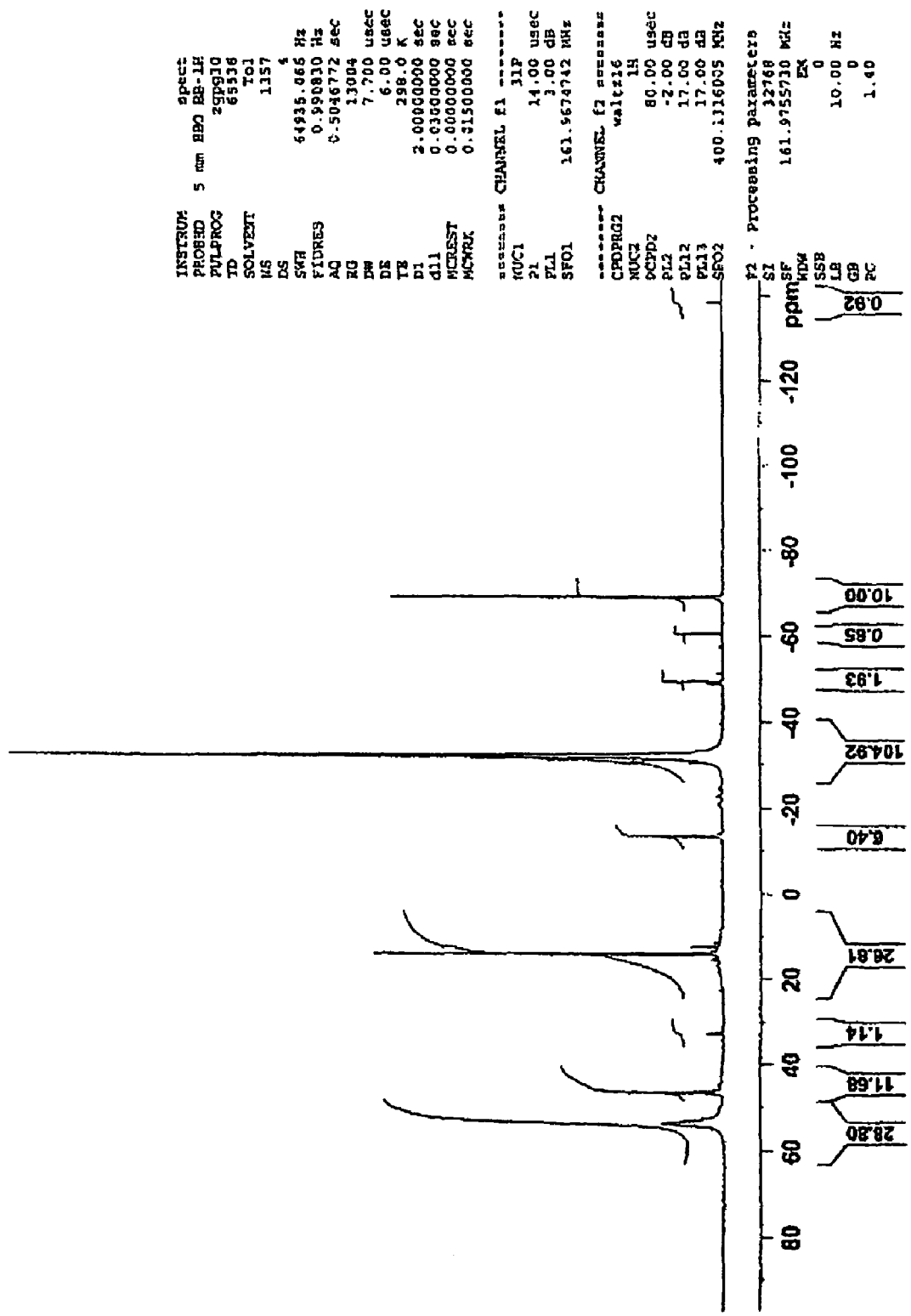
FIG. 5 is a $^{31}P$ Nuclear Magnetic Resonance spectrum of a mixture comprising contaminants before processing the mixture in accordance with the present invention.

FIG. 5 illustrates the results of a second method of detecting contaminants in mixtures comprising nanocrystals in accordance with the present invention. Using $^{31}$P Nuclear Magnetic Resonance ($^{31}$P NMR) spectroscopy, FIG. 5 plots phosphorous containing organic contaminants detected from the supernatant of a post-synthesis batch reaction sample, in which the nanocrystals and bound surfactant have been removed by precipitation and centrifugation. The table lists the experimental parameters used for the detection experiment. The peaks correspond to distinct magnetic environments of the phosphorous nuclei of different contaminants.

FIGS. 6A and 6B illustrate a third method of detecting contaminants in mixtures comprising nanocrystals, in accordance with the present invention. FIGS. 6A and 6B are Transmission Electron Microscopy (TEM) micrographs showing mixtures of nanocrystal populations comprising nanocrystals 610 and organic contaminants 620. In particular, FIG. 6A shows an area of nanocrystal aggregation 630.

Referring back to FIG. 3, the methods of the present invention further comprise using chromatography to reduce the level of contaminants in the mixture, at a step 306. The type of chromatography used in the present invention can be any method of chromatography known to one of ordinary skill in the art, provided that the chromatography reduces the amount of contaminants in the mixture and allows for reducing and control of the amount of bound surfactant to the nanocrystal. Preferred methods of chromatography include those methods that allow for rapid processing of the nanocrystals, reduce the amount of contaminants in the mixture, and allow for control of the amount of surfactant bound to the nanocrystal. Examples of chromatography for use in the present invention include but are not limited to size exclusion chromatography (SEC), gel permeation chromatography (GPC), thin layer chromatography (TLC), high performance liquid chromatography (HPLC) including normal and reversed-phase chromatography, flash chromatography, column chromatography, ion exchange chromatography and electrophoresis. The choice of chromatography depends on factors including the desired level of purity of nanocrystals, the desired level of control of the amount of bound surfactant, the available time to process the mixture and the air sensitivity of the nanocrystals. One preferred method of chromatography is size exclusion chromatography (SEC). SEC allows for the rapid detection and separation of nanocrystals and contaminants, and offers flexibility in choice of solid phases, mobile phases, and can be performed under an inert atmosphere. Another preferred method of chromatography is reversed-phase chromatography.

The solvent in which the nanocrystals are processed can be any solvent or mixture of one or more solvents. The solvent can be any organic or inorganic solvent. Examples of solvents include but are not limited to $C_1$-$C_{18}$ hydrocarbons and haloalkanes such as dichloromethane, chloroform and carbon tetrachloride; aromatic solvents such as benzene, toluene, pyridine, xylenes, trimethylbenzenes, chlorobenzene, dichlorobenzenes, trichloro-benzenes, and phenols; alcohols such as $C_1$-$C_{10}$ alcohols, for example, methanol, ethanol, propanols and the like; $C_1$-$C_{10}$ di- and tri-alcohols such as ethylene glycol and glycerol; ethers such as diethyl ether, t-butyl methyl ether, oligomers of ethylene glycol, and tetrahydrofuran; nitriles, e.g. acetonitrile, carboxylic esters such as $C_1$-$C_4$ acetates, for example, methyl acetate and ethyl acetate, ketones such as acetone and t-butyl methyl ketone; amides such as N,N-dimethylacetamide, dimethyl sulfoxide; and water or other aqueous solvent mixtures. Preferred solvents include those solvents which allow for the reduction and removal of contaminants, are inert to the nanocrystals and are easily removed during nanocrystal isolation. Examples of preferred solvents include, but are not limited to toluene, chloroform, tetrahydrofuran and mixtures of alcohols with toluene or chloroform.

In one aspect of the invention, the chromatography column is pre-conditioned with ligand or surfactant before the nanocrystals are processed on the column. Preconditioning chromatography columns is well known in the art and any method known to one skilled in the relevant art can be used.

Figure 7:
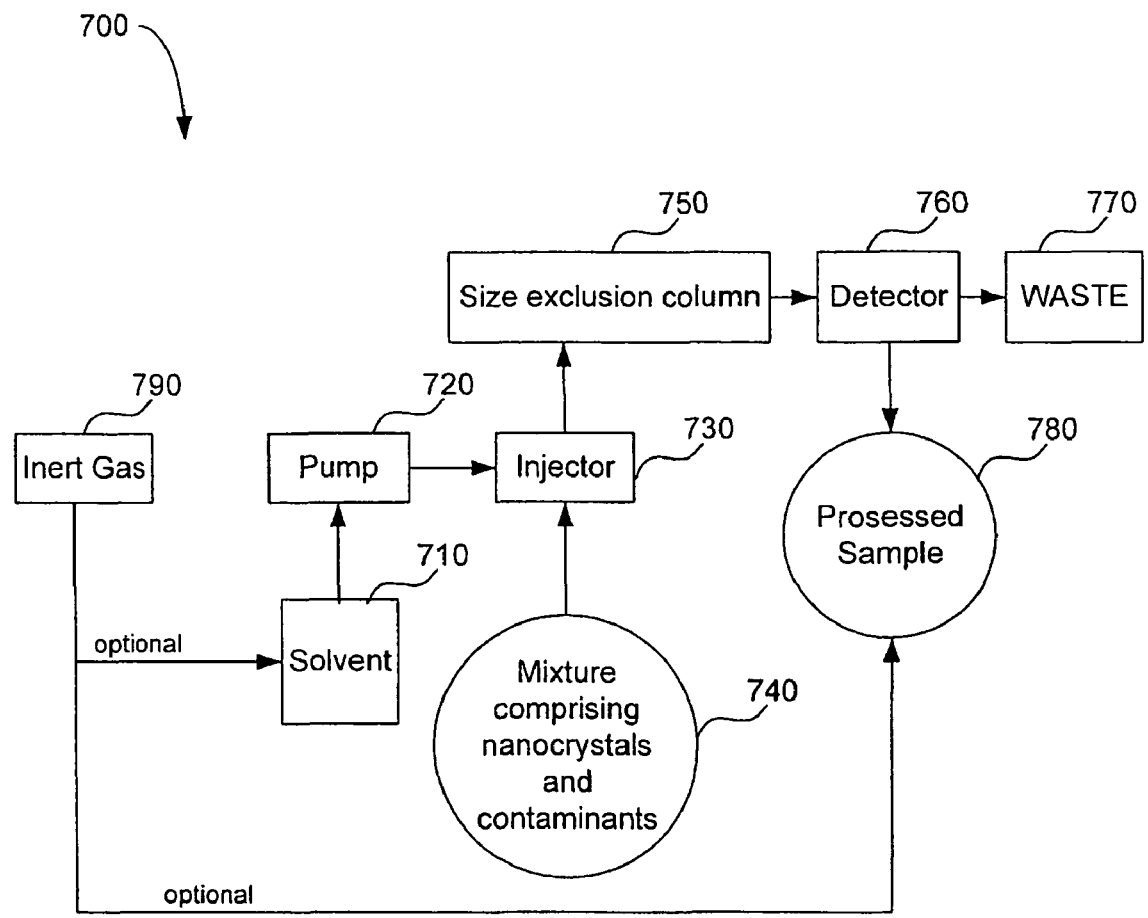
FIG. 7 depicts a Size Exclusion Chromatography apparatus for use in the present invention.

FIG. 7 illustrates an example of a SEC apparatus for use in present invention. Solvent, 710, is pumped through a pumping system 720 and through injector 730, where the mixture comprising the nanocrystals and contaminants 740 is injected. The mixture is processed through SEC column 750 and the separated material is detected by detector 760. The material can be optionally sent to waste receptacle 770, or collected as processed sample 780. The solvent and sample collection areas are optionally kept under inert gas. Standard equipment known to one of ordinary skill in the art can be used for the SEC apparatus. However, in the case of air-sensitive nanocrystals that require inert conditions, optional inert gas 790 is used to maintain the system under inert gas. Inert gas 790 is also optionally applied to solvent reservoir 710 and processed sample reservoir 780.

Figure 8:
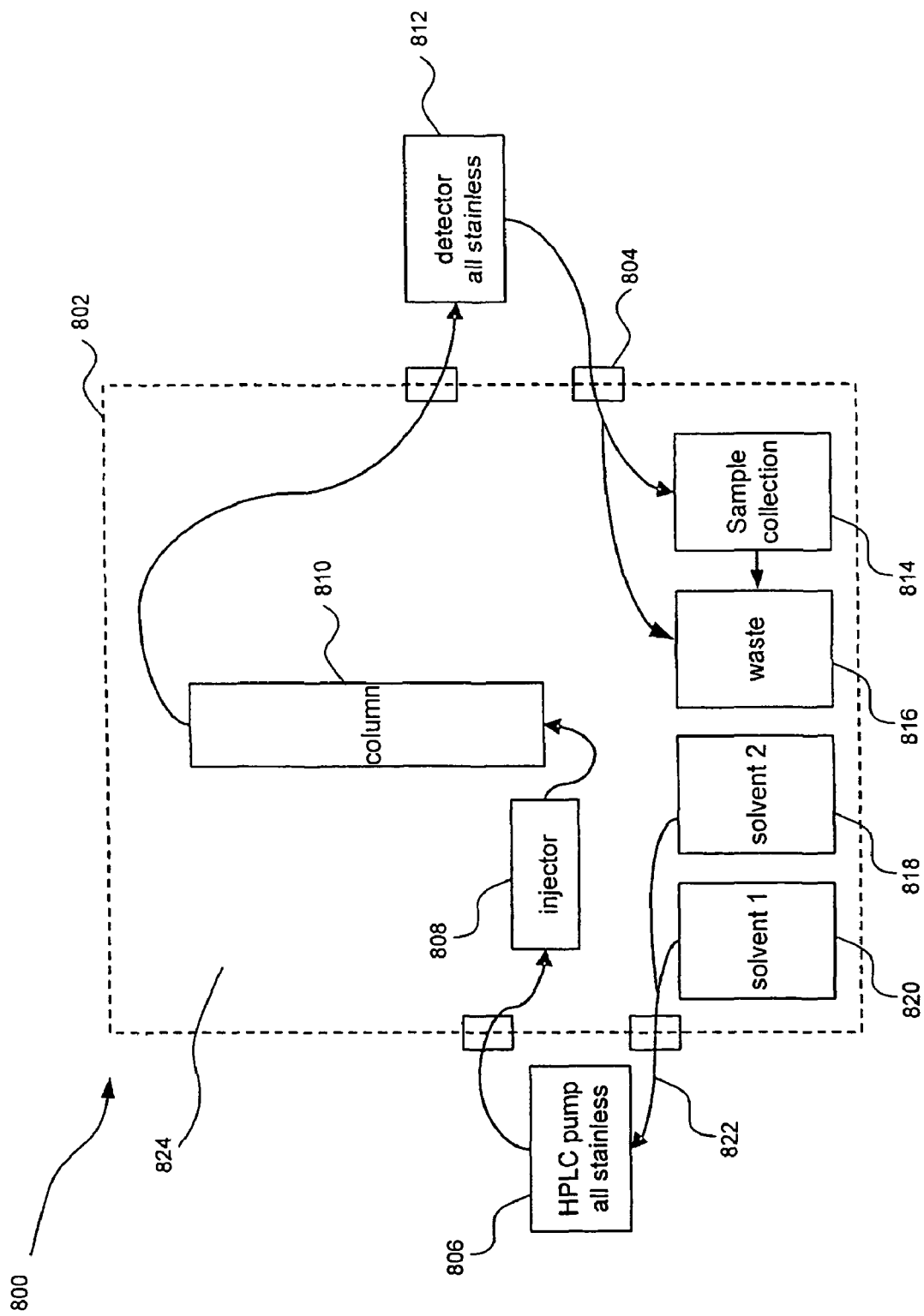
FIG. 8 shows system 800 for performing chromatography under inert conditions in accordance with the present invention.

FIG. 8 shows an alternative system 800 in which all the components of the chromatography system that may allow air to contact sensitive materials are kept under an inert atmosphere, 824. The system includes a sealable box 802 for housing the equipment. A specific example of a sealable box for use in the present invention is a glove box, which is well known to one of skill in the relevant art. The mixture comprising nanocrystals to be purified is injected into injector 808. Solvent is stored in containers 818 and 820, and circulated through the system via pump 806 and stainless steel tubing 822. The mixture is processed through the chromatography column 810 and the separated material is detected by detector 812. The material can be optionally sent to waste receptacle 816 or collected as processed sample in receptacle 814. Variation of the structure and arrangement of the elements of systems 800 can be made, as would be apparent by practitioners having ordinary skill in the art, without departing from the spirit and scope of the present invention.

Any material can be used as a solid phase for packing the chromatographic columns of the present invention, provided that, after processing, the resulting mixtures have a reduced amount of contaminants in the mixture. Examples of packing material include, but are not limited to cross-linked polystyrene, other organic polymers that gel in a given solvent (e.g., methacrylate polymers and polyvinylchloride), silica and silica-based stationary phases having siloxane bonded organic functional groups (e.g., $C_8$ and $C_{18}$ linear hydrocarbon bonded siloxanes). A preferred solid phase for reversed-phase chromatography is $C_{18}$ linear hydrocarbon bonded siloxanes. The detectors for use in the present invention can be any detector capable of detecting and distinguishing between nanocrystals and contaminants. For example, refractive index detectors and ultraviolet (UV) absorbance detectors are used.

Referring back to FIG. 3, the methods of the present invention further optionally comprise detecting the amount of contaminants in the mixture 308 after chromatography 306. As above, any method of detection can be used to determine the amount of contaminant remaining in the mixture after chromatography. Alternatively, step 308 is skipped and the chromatography detector is used to analyze the mixture post-processing.

Figure 9:
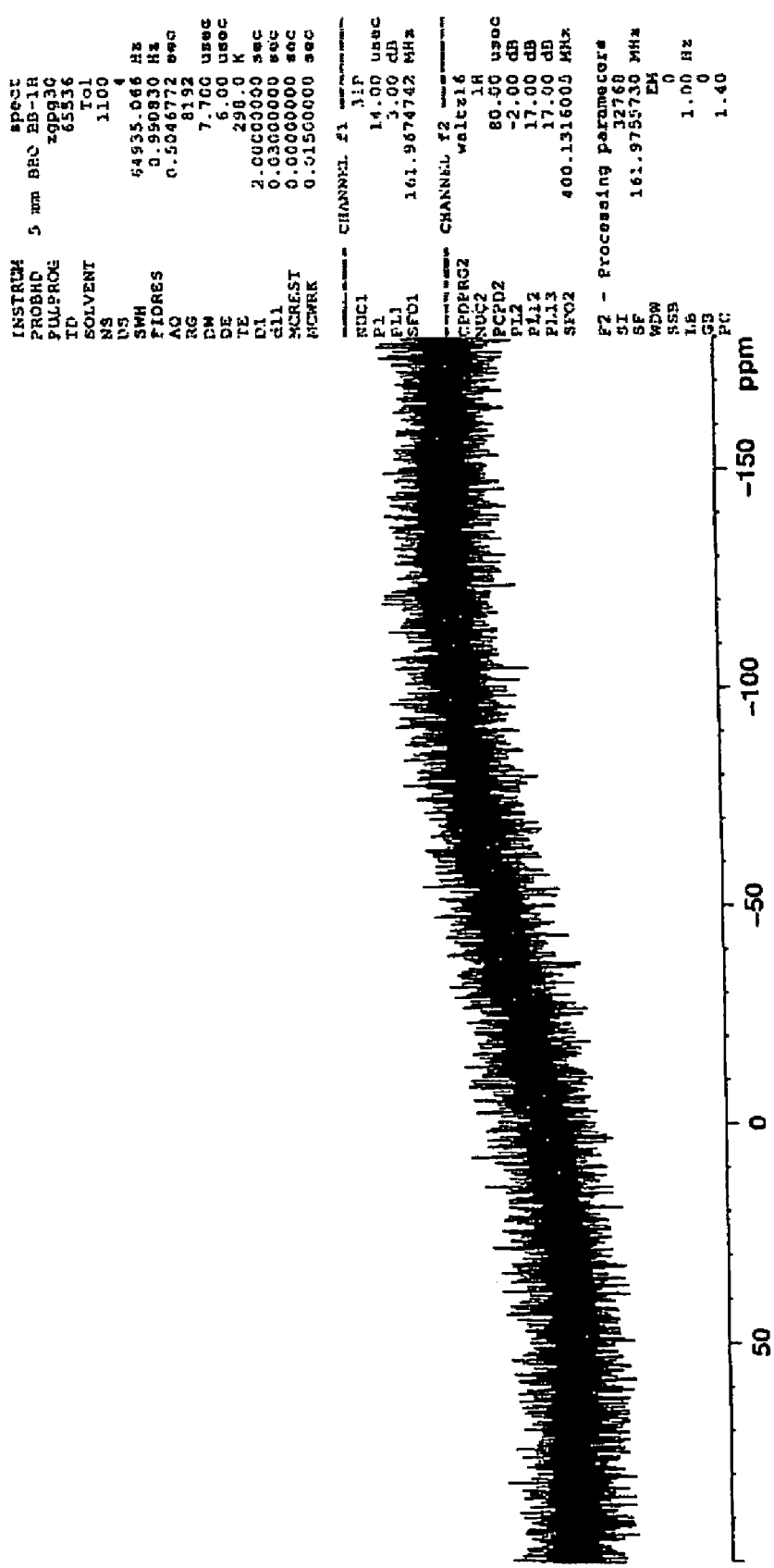
FIG. 9 shows a $^{31}$P Nuclear Magnetic Resonance spectrum of a first fraction taken from SEC processing in accordance with the present invention.
Figure 10:
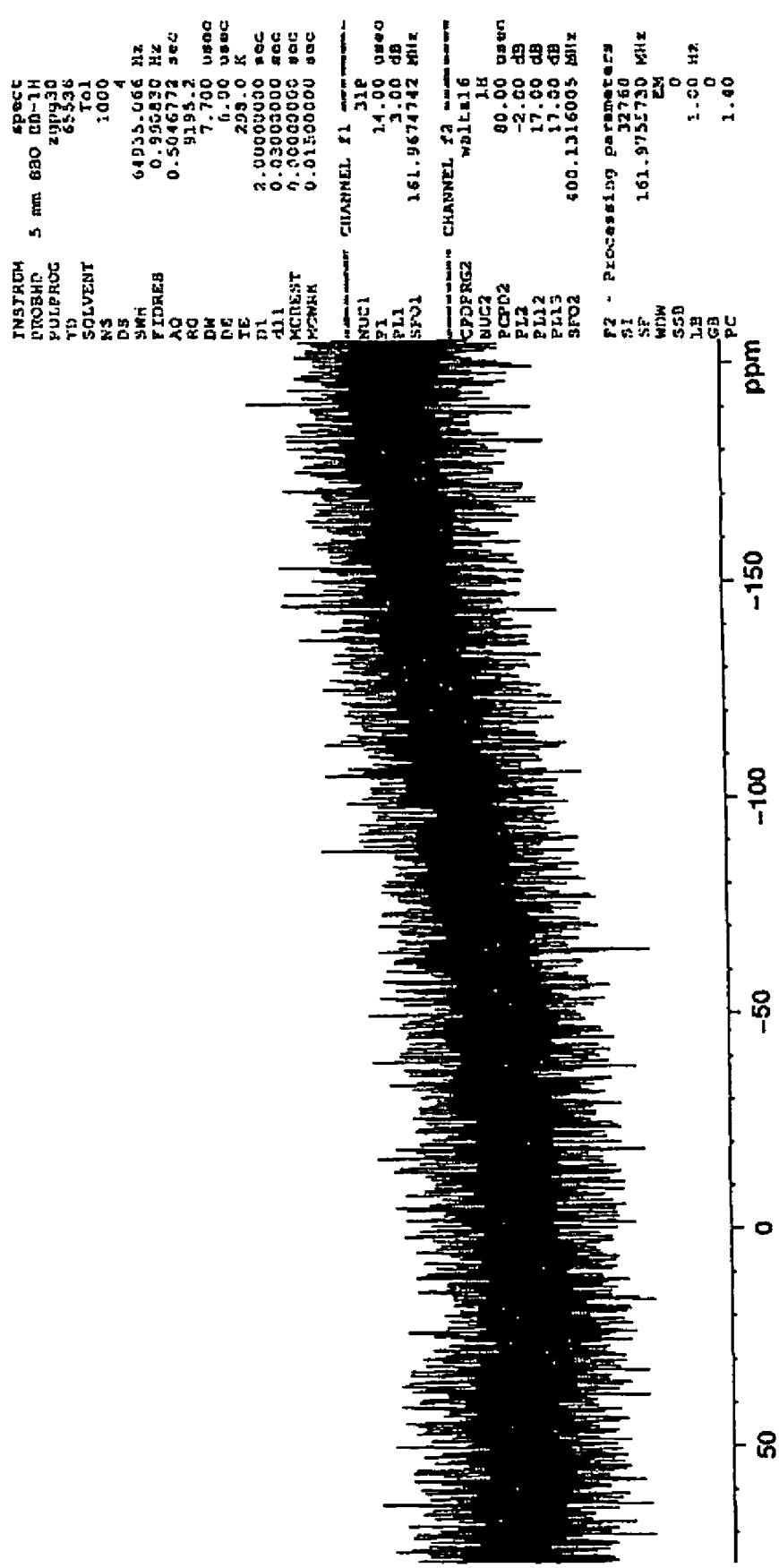
FIG. 10 shows a $^{31}$P Nuclear Magnetic Resonance spectrum of a second fraction taken from SEC processing in accordance with the present invention.
Figure 11:
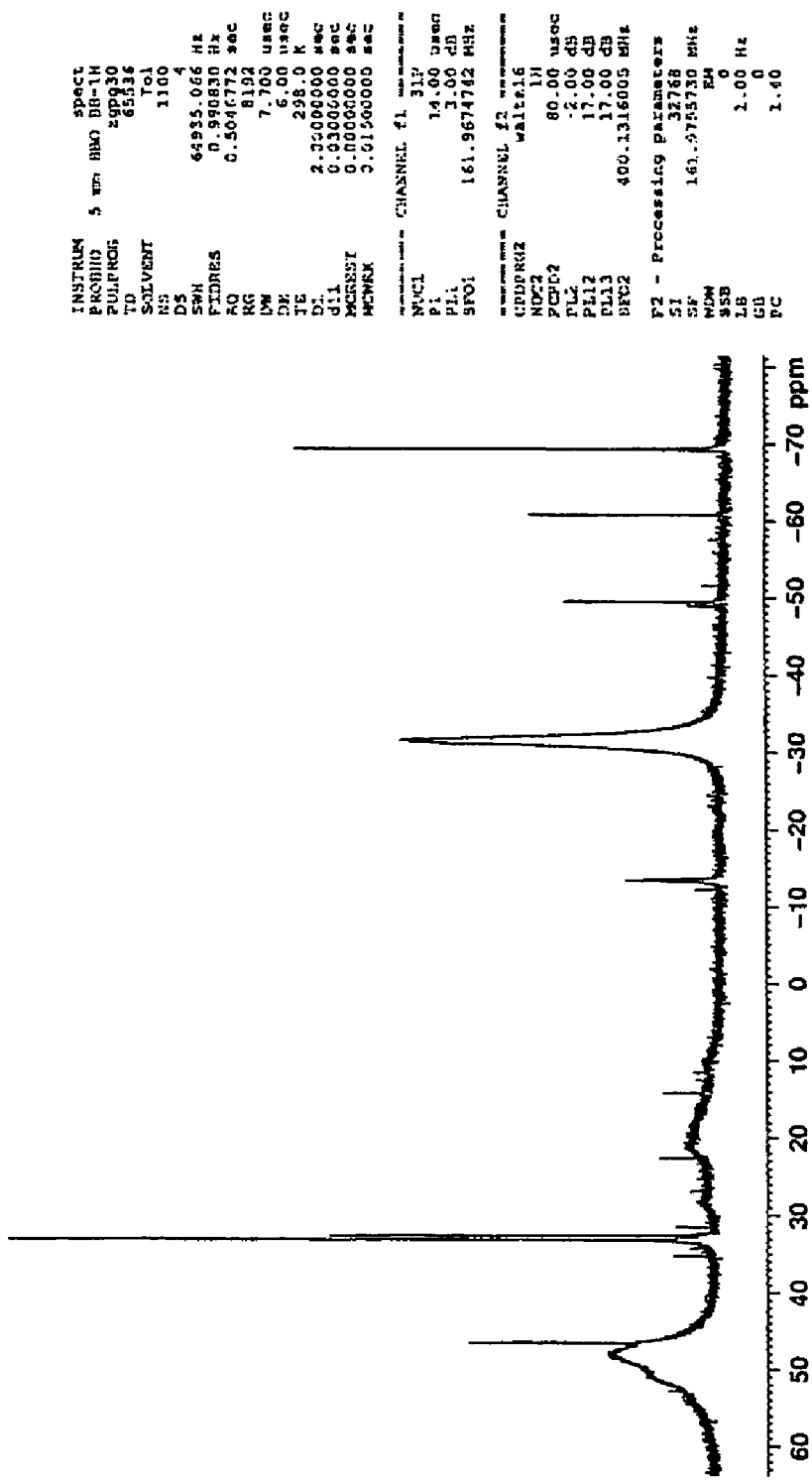
FIG. 11 shows a $^{31}$P Nuclear Magnetic Resonance spectrum of a third fraction taken from SEC processing in accordance with the present invention.

FIGS. 9-11 illustrate a first method of detecting the amount of contaminant in processed SEC fractions using $^{31}$P NMR. Accordingly, if a flat line, or a line with no narrow peaks, is observed, then no detectable phosphorous containing contaminants are present in the sample. FIG. 9 shows fraction 1, in which no phosphorous containing contaminant is detectable. In FIG. 9, the spectrum is a nearly flat line, with only noise appearing in the spectrum. FIG. 10 shows fraction 2, in which little to no phosphorous containing contaminant is detectable. In FIG. 10, the spectrum shows greater signal than FIG. 9 but no discernible peaks are detected. And FIG. 11 shows fraction 3, in which phosphorous containing contaminant is detectable. In FIG. 11, clear peaks showing the presence of phosphorous containing contaminants are seen, whereas, no peaks are seen in either FIG. 9 or 10.

Figure 12:
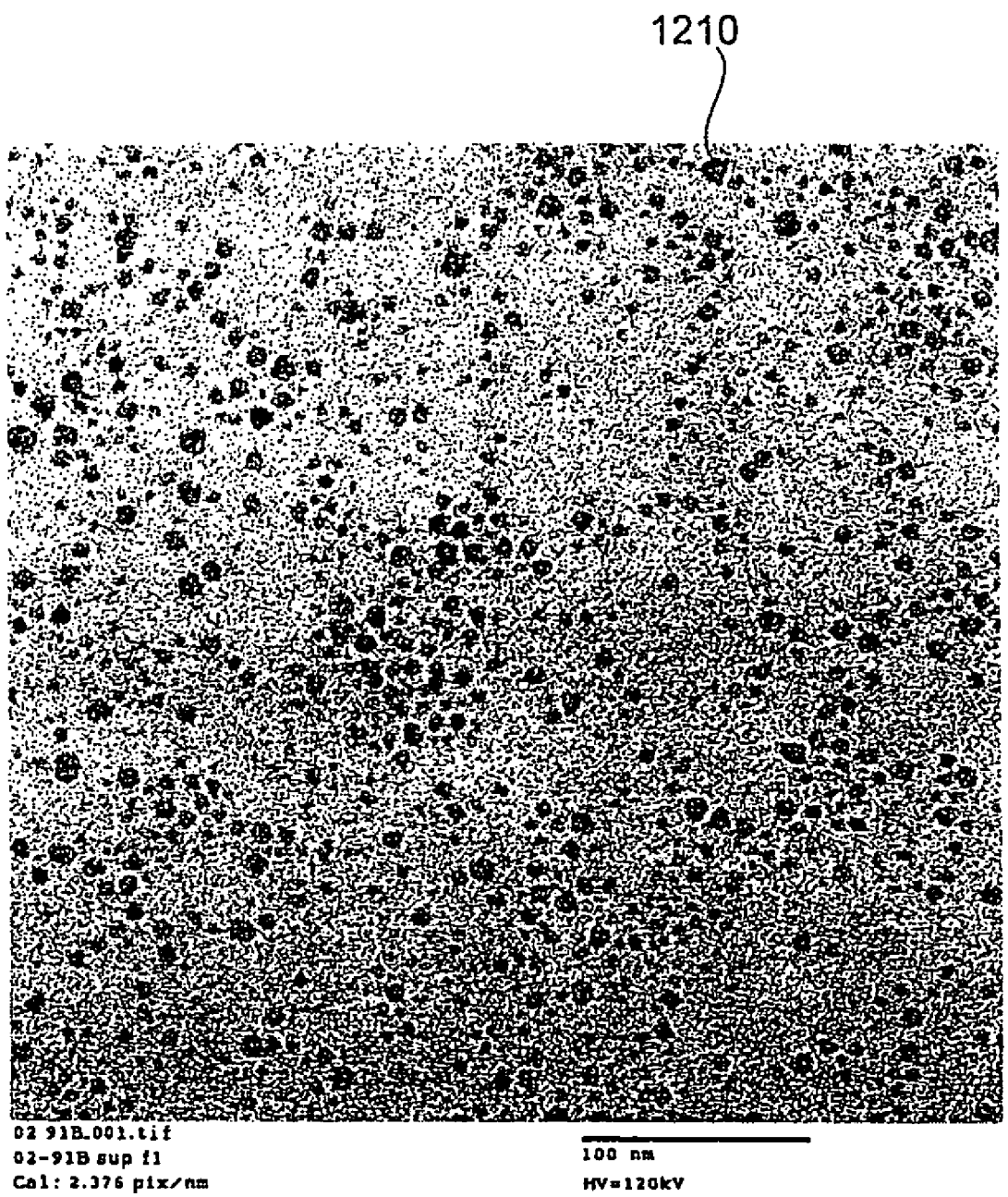
FIG. 12 shows a 100 nm resolution TEM micrograph of a mixture comprising nanocrystals processed in accordance with the present invention.
Figure 13:
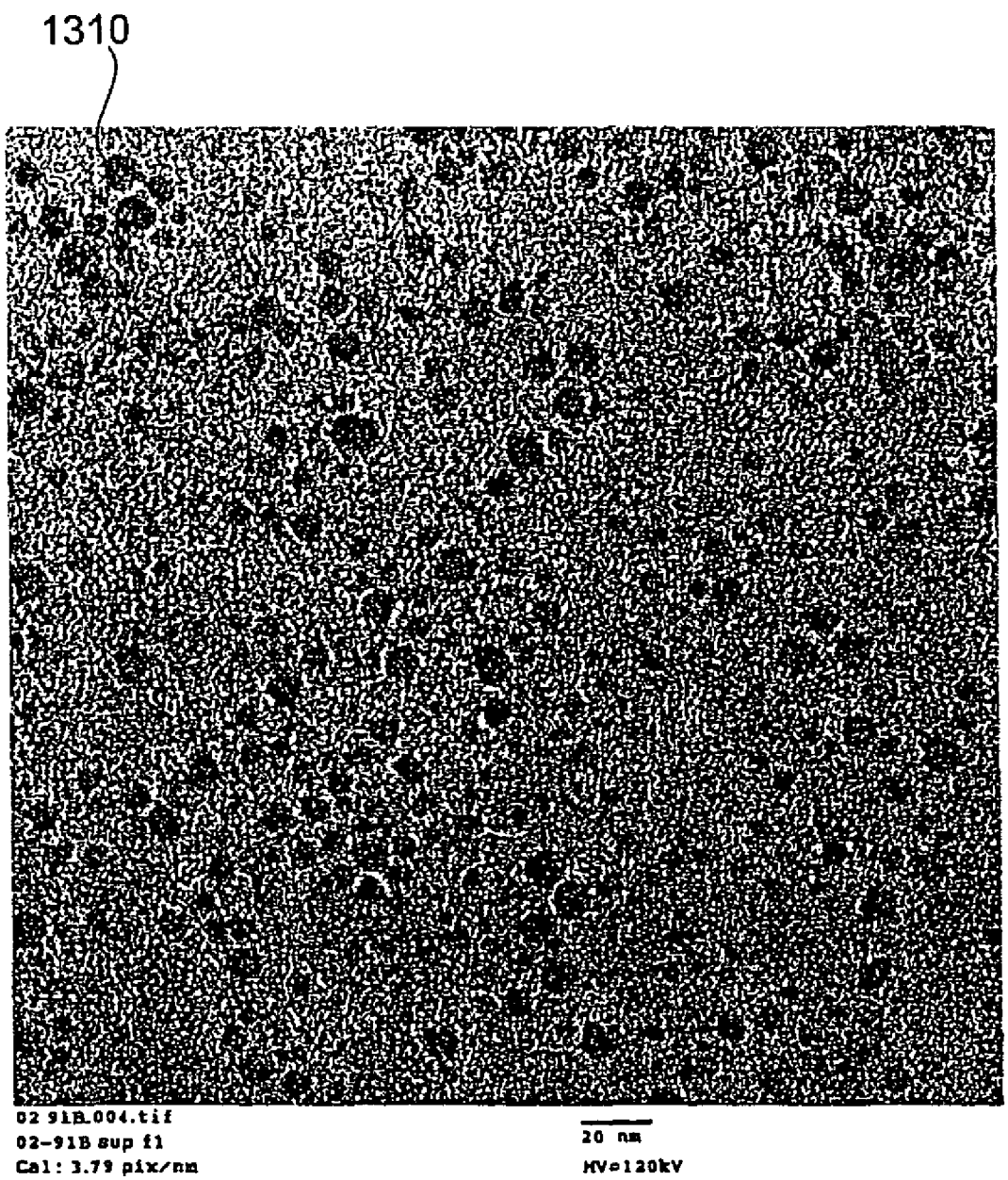
FIG. 13 shows a 20 nm resolution TEM micrograph of a mixture comprising nanocrystals processed in accordance with the present invention.

FIGS. 12-13 illustrate a second method of detecting the amount of contaminant in processed mixtures using transmission electron microscopy. FIG. 12 shows TEM micrograph with 100 nm scale bar, which shows no detectable organic contaminant in the sample. Only processed spherical nanocrystals 1210 are detectable. There is also little to no aggregation of nanocrystals 1210, which illustrates both the solubility and processibility of the nanocrystals after processing using chromatography. FIG. 13 shows the same TEM micrograph with 20 nm scale bar, which also shows no detectable contaminants and little to no aggregation of nanocrystals, 1310.

The chromatography step used to reduce the amount of excess free surfactant, bound surfactant and other contaminants, or other processing steps, can be repeated until the amount of free surfactant in the nanocrystal mixture is less than about 5% of the total surfactant concentration (free and bound), preferably less than about 1%, and more preferably less than about 0.1% of the total amount of surfactant. Alternatively, the processing steps are repeated until the nanocrystals comprise from about a partial monolayer to a bilayer of bound surfactant. Alternatively, a single chromatography step is performed and the mixture is further processed in other optional processing steps to further reduce the amount of free surfactant.

Referring back to FIG. 3, the methods of the present invention further comprise the optional step of isolating the nanocrystals, 310. Any method known to one of ordinary skill in the art can be used to isolate the nanocrystals from a processed mixture. An example of an isolation method is precipitation followed by filtration or centrifugation, which can be repeated one or more times. Precipitation of nanocrystals from solution is well known in the art. (See, e.g., Peng, A. A. and Peng, X., *J. Am. Chem. Soc.* 124:3343-3353 (2002); Manna et al., *J. Am. Chem. Soc.* 124:7136-7145 (2002); and Murray, C. B. et al., *J. Am. Chem. Soc.* 115:8706-8715 (1993).) By way of example, the precipitating of the nanocrystal populations is carried out using a mixed solvent process that employs a solvent mixture that includes at least two different solvents of differing polarity whereby the nanocrystals are soluble in a sufficient concentration of a nonpolar or less polar first solvent and less soluble or insoluble in a sufficient concentration of the more polar second solvent. In the first or solubilizing solvent mixture, the processed nanocrystals are soluble. Typically, the nanocrystal portion of the mixture is then precipitated from the solvent mixture by adding or elevating the concentration of the second or more polar solvent (or lowering the concentration of first or less polar solvent) to the point at which the nanocrystals are no longer soluble in the mixture. As will be appreciated by those skilled in the art, the inverse treatment may also be used where the nanocrystals have a large enough level of solubilizing surfactant associated with them, e.g., making them more soluble in more polar solvents, which then might dictate precipitation by increasing the concentration of less polar solvent in the mixture.

The precipitated nanocrystals are then separated from the solvent mixture by, e.g., centrifugation, filtering or the like. The isolated nanocrystal population can then be subjected to additional processing steps. These additional steps can include further purification by repeating the chromatography or by repeated precipitation. Once the nanocrystals have reached the desired level of purity, the nanocrystals can be further processed into compositions, composites, devices, and the like.

In another aspect, the present invention allows for the combination of chromatography and precipitation steps to further process the nanocrystal populations. It is understood by one of ordinary skill in the art that the precipitation of nanocrystal populations can be performed before and/or after the chromatography. It is also understood that the precipitation step can be performed any number of times before and/or after the chromatography. The use of nanocrystal precipitation as a method of purifying nanocrystal populations has been previously disclosed. (See, e.g., Scher, E., et al. U.S. Provisional Patent Appl. 60/544,285; and U.S. patent application Ser. Nos. 10/656,910 and 10/656,802, the full disclosures of which are hereby incorporated herein by reference in their entirety for all purposes.)

Figure 14:
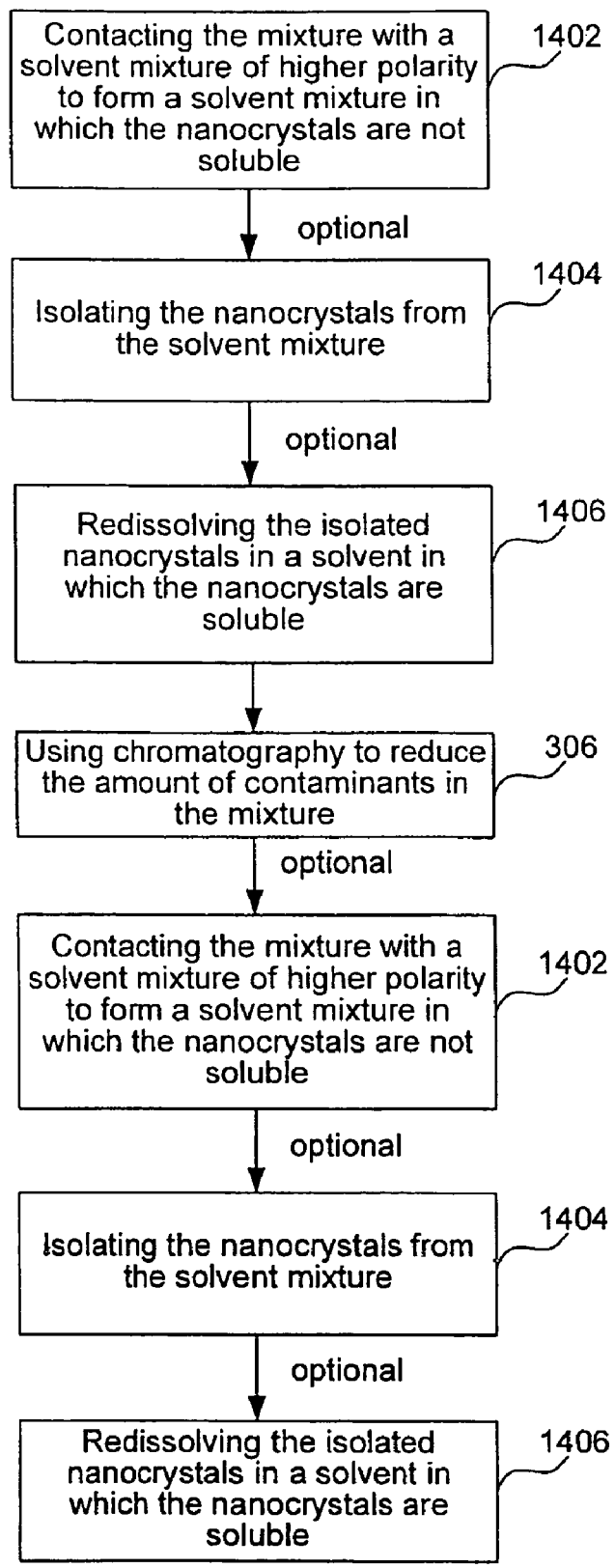
FIG. 14 is a flow chart illustrating optional nanocrystal precipitation steps for processing nanocrystals in accordance with the present invention.

Accordingly, FIG. 14 illustrates a further optional aspect of the present invention. At a step 1402, the mixture is contacted with a solvent mixture of higher polarity and forms a solvent mixture in which the nanocrystals are not soluble. Optionally, at a step 1404, the nanocrystals are isolated from the solvent mixture to provide nanocrystals having a reduced level of contaminants. Optionally, at a step 1406, the isolated nanocrystals are redissolved in a solvent in which the nanocrystals are soluble to form a mixture comprising nanocrystals and solvent in which the nanocrystals are soluble. The mixture thus formed is further processed using chromatography (as described above in connection with FIG. 3) to reduce the amount of contaminants in the mixture. Optionally, post chromatography, the nanocrystals are further processed by steps 1402 through 1406, to form a processed mixture comprising nanocrystals and solvent in which the nanocrystals are soluble. The mixture can be further processed in additional chromatography steps, in alternating chromatography and precipitation steps, or in some other processing steps, such as reducing the amount of bound surfactant by titration, or the integration of the nanocrystals in composites or devices. The chromatography and optional precipitation and re-dissolution steps are optionally repeated as necessary, in any order. Processing steps can be repeated until the amount of free surfactant in the nanocrystal mixture is less than about 5% of the total surfactant concentration (free and bound), preferably less than about 1%, and more preferably less than about 0.1% of the total amount of surfactant. Alternatively, the processing steps are repeated until the nanocrystals comprise from about a partial monolayer to a bilayer of bound surfactant.

The solvents used in the precipitation solvent mixtures as well as their relative concentrations will typically vary depending upon the nature of the nanocrystals and the organic contaminant that is sought to be removed, e.g., the type of surfactants present. In general, however, the inorganic nanocrystal populations are generally soluble in relatively less polar solvents, such as toluene, benzene or hexanes, and the like, as well as chloroform, which while generally polar, is relatively less polar than, e.g., methanol, and in which nanocrystals are soluble. Conversely, organic materials, and particularly more polar organic materials, i.e., surfactants, typically favor more polar environments for solubility, such as relatively low molecular weight alcohols, e.g., methanol and ethanol, and in cases of certain preferred surfactants, alcohols that have greater than two carbon atoms, e.g., isopropanol, butanol, or the like. As a result, in accordance with certain aspects of the invention, the less polar solvent portion of the solvent mixtures will typically include a less polar solvent such as chloroform, toluene, hexanes, benzene or the like. A more polar solvent portion of the solvent mixtures will typically include a more polar solvent such as methanol, ethanol, isopropanol, butanol, ethyl acetate or acetone. Once the nanocrystals are precipitated, the nanocrystals are isolated from the liquid portion of the suspension by any means, including centrifugation, filtration, or the like.

Figure 15:
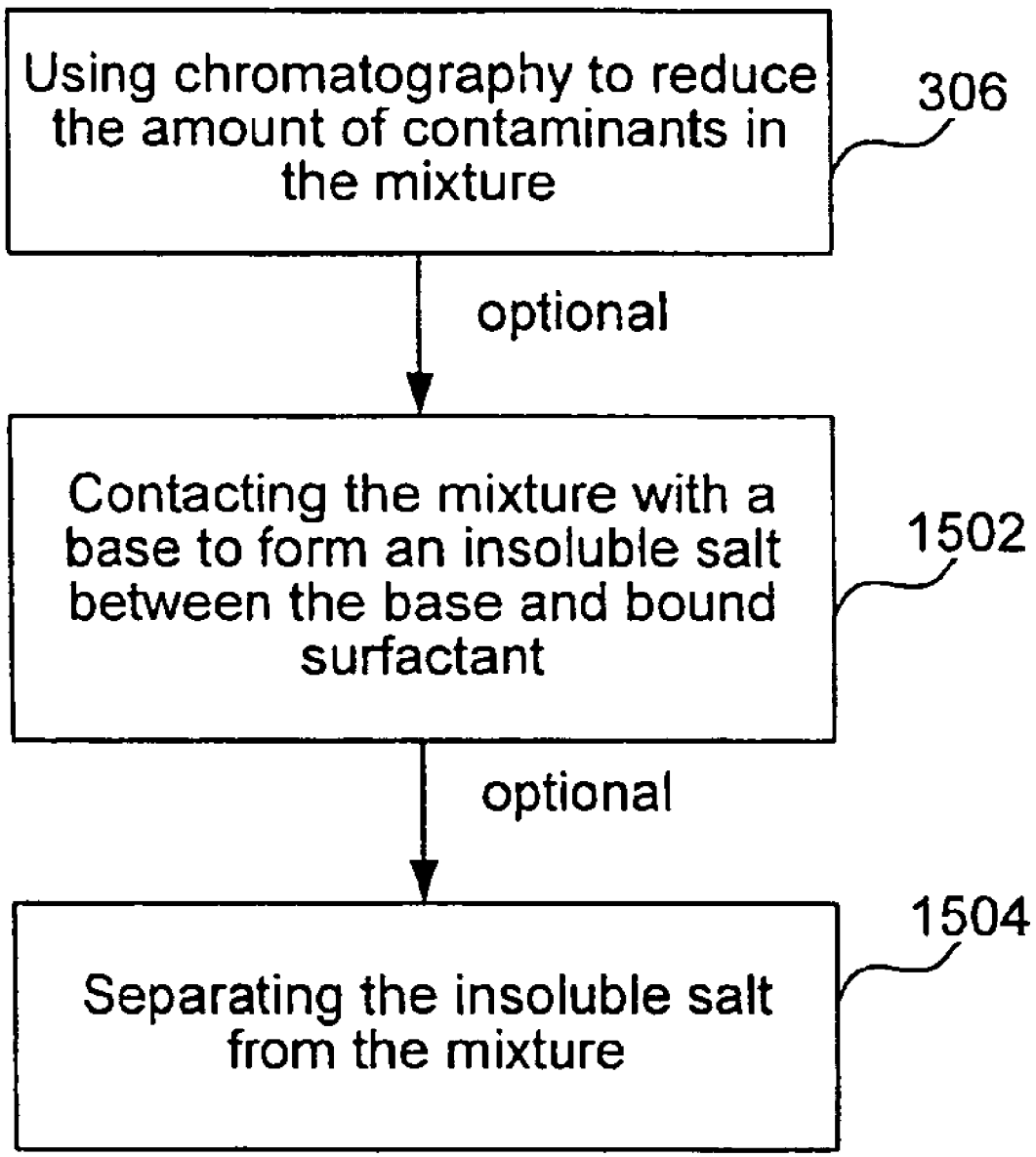
FIG. 15 is a flow chart illustrating optional bound surfactant precipitation steps for processing nanocrystals in accordance with the present invention.

FIG. 15 illustrates yet a further aspect of the present invention. Once the excess free surfactant is removed from the nanocrystals, e.g., following the last chromatography, precipitation or isolating step, the resulting nanocrystals may then be further processed to reduce the level of bound surfactant on the surfaces of the nanocrystals. After using chromatography, 306, the mixture is optionally contacted, at a step 1502, with a reagent that reacts with, sequesters or modifies the surfactant in order to change its affinity for the nanocrystal surface or another chemical property to allow its separation from the nanocrystal. Optionally, separating, at a step 1504, the modified surfactant from the mixture reduces the amount of surfactant bound to the nanocrystal. In one example, the mixture is contacted with a base that reacts with acidic surfactant to form an insoluble salt between the base and bound surfactant. Examples of bases that are particularly suitable for complexing with the surfactants include those which form insoluble salts with the surfactants, thus precipitating away from the solution and out of the chemical equilibrium equation. Some particularly useful organic bases include, e.g., pyridine, aniline, bypyridyl, piperidine, imidazole, diethylamine, triethylamine, di-isopropylamine, and other alkyl amines, and the like. In particularly preferred aspects, pyridine is used as the base as it readily titrates the acid groups on the preferred surfactants, e.g., ODPA, HDPA, etc., to yield salts that are insoluble in the solvent that contains the nanocrystals, e.g., the less polar component, i.e., toluene.

Figure 16A:
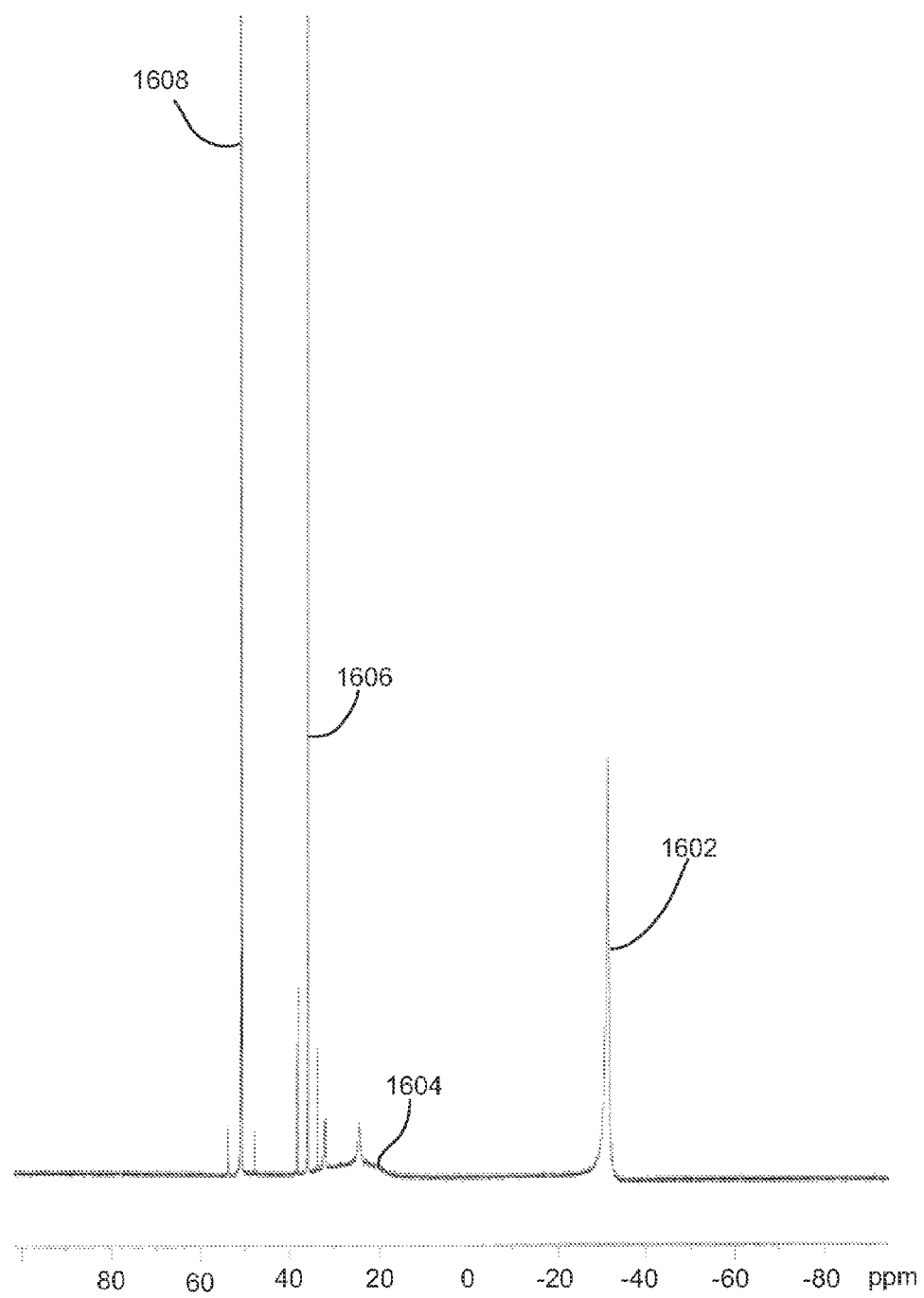
FIGS. 16A-G show $^{31}$P Nuclear Magnetic Resonance spectra that demonstrate a method of measuring surfactant levels in mixtures comprising nanocrystals in accordance with the present invention.
Figure 16B:
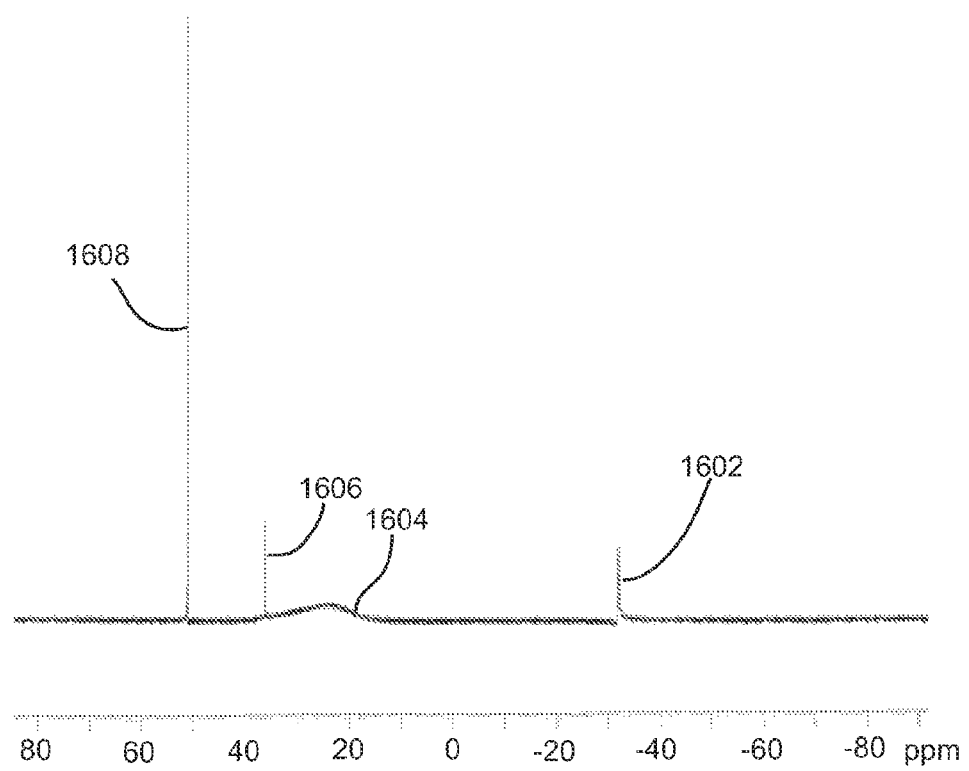
Figure 16C:
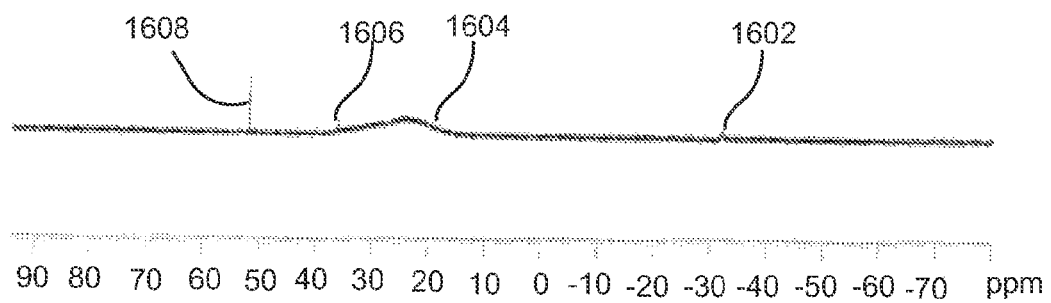
Figure 16D:
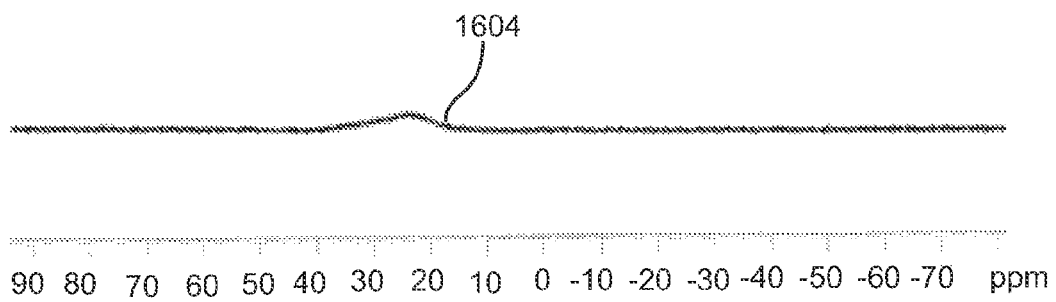
Figure 16E:
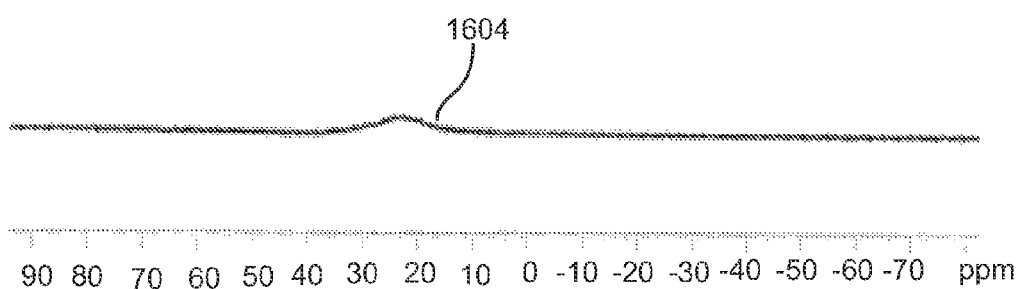
Figure 16F:
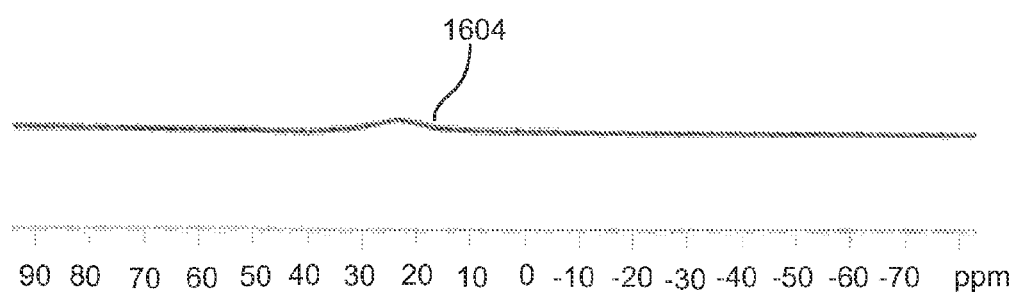
Figure 16G:
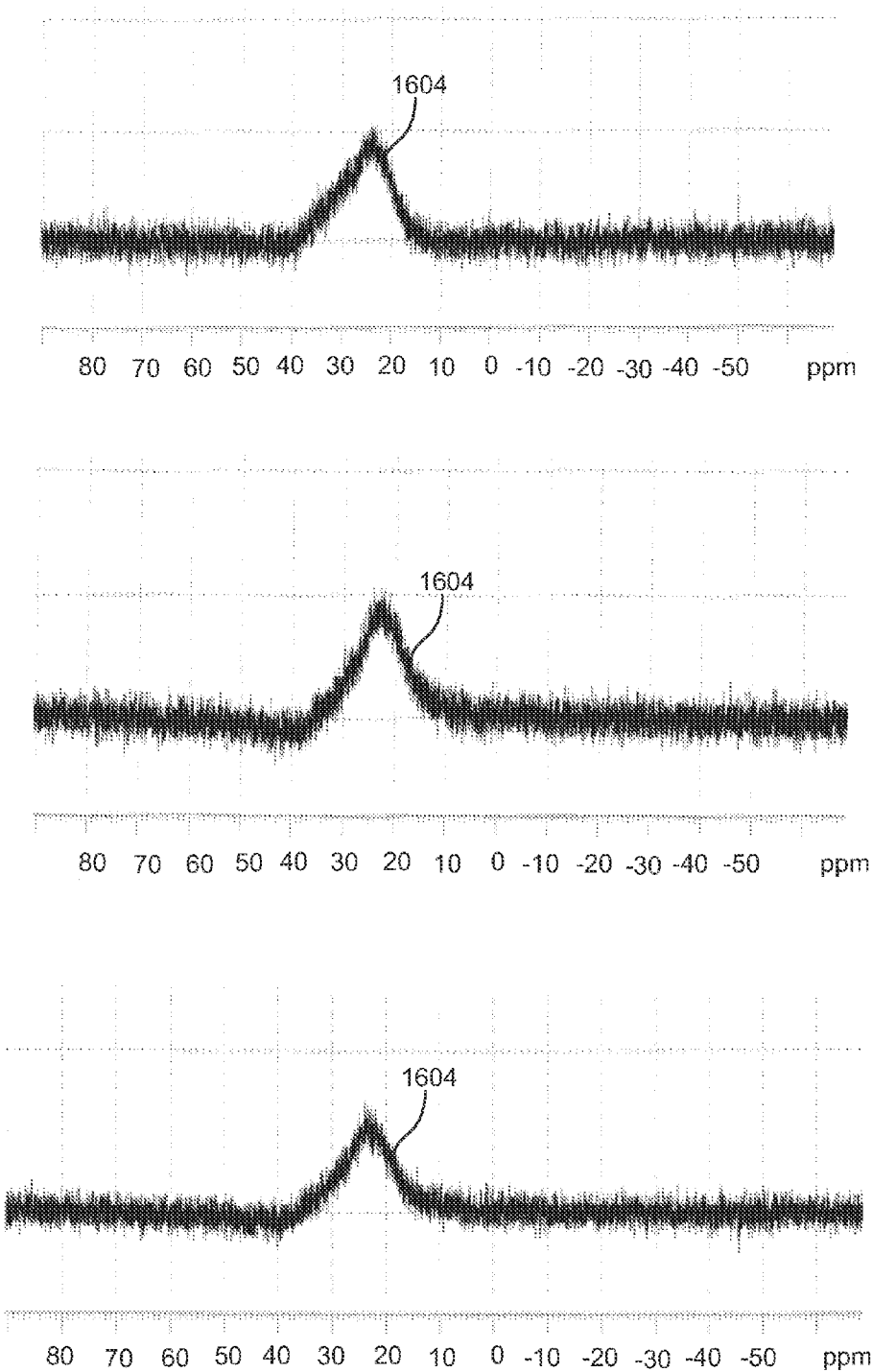

Determination of the amount of free and bound surfactant can be carried out by any method known to one of ordinary skill in the art. (See, e.g., Peng, A. A. and Peng, X., *J. Am. Chem. Soc.* 124:3343-3353 (2002).) For example, the amount of free surfactant can be determined by chromatography using methods well known in the art. The amount of bound surfactant can be determined by isolating the nanocrystals and digesting the nanocrystals using an appropriate acid, for example, nitric acid. The surfactant is extracted from the digestion solution and the amount is measured. Alternatively, $^{31}$P-NMR spectroscopy is used for phosphorous containing surfactants. As an example, FIGS. 16A-G show a series of $^{31}$P-NMR spectrograms of for CdSe nanorod populations showing reduced levels of surfactant as the nanocrystals are washed. As shown, each successive washing step significantly reduces the amount of free surfactant, shown as peaks 1602, 1606, and 1608, relative to the amount of bound surfactant, shown as 1604. In this example, peak 1602 corresponds to free tributylphosphine, 1604 corresponds to tetradecylphosphonic acid and hexylphosphonic acid, 1606 corresponds to free tetradecylphosphonic acid and hexylphosphonic acid, and 1608 corresponds to free trioctylphosphine oxide. Using standard techniques, it is possible to measure both the amount of free surfactant and bound surfactant. Following four washing steps, the amount of free surfactant is virtually undetectable in the nanocrystal containing solution (See FIG. 16D). Additional washing steps, e.g., washes 5 and 6, also begin to further reduce the level of bound surfactant as indicated by the slight flattening of the broad peak (FIG. 16E, 16F and 16G). The amounts of surfactant can be calculated from the peaks using methods well known in the art.

In yet another aspect, the present invention relates to a composition, comprising a population of nanocrystals dissolved in a solvent, and wherein the nanocrystals have a total amount of surfactant associated therewith, the amount of surfactant comprising an amount of bound surfactant and an amount of free surfactant in the solvent, the amount of free surfactant being less than about 10% to about 0.1% of the total amount of surfactant. The present invention also relates to a composition, comprising a population of nanocrystals dissolved in a solvent, wherein the population of nanocrystals comprise less than a tri-layer or less than a bilayer of surfactant associated therewith. Having prepared compositions of nanocrystals having reduced free surfactant and other contaminants, the nanocrystal compositions can be further processed into composites and devices.

Accordingly, yet another aspect of the present invention relates to a composite, comprising a matrix and a population of nanocrystals comprising less than a bilayer of surfactant associated therewith disposed within the matrix. The matrix can be any material in which the nanocrystals can be dispersed. Specific examples of preferred matrices include, but are not limited to organic and inorganic polymers, ceramics, glass, sol-gels and liquid crystals.

Optionally, the composite is a freestanding nanocrystal-matrix composite. The freestanding nanocrystal-matrix composite can be in the form of a sheet that can be rolled and stored for later use or further processing. Alternatively, the nanocrystal-matrix composite is attached, adheres or is bound to a surface of another material. For example, the nanocrystal-matrix composite can be deposited onto an ITO-coated glass surface for device fabrication.

In one aspect, the nanocrystal-matrix composite comprises a polymer as the matrix and the nanocrystals are embedded in the polymer. Suitable polymers include, but are not limited to an elastomer, thermoplastic, thermosetting resin or a combination thereof. Particularly, polymers for use include oligomers, which include, but are not limited to monomers, dimers, trimers, tetramers, pentamers, hexamers, heptamers, octamers, nonamers, decamers, undecamers, and dodecamers; branched, hyperbranched, dendritic and other non-linear structural forms of polymers; prepolymers such as phenoxy and epoxy prepolymers; networked polymers such as interpenetrating and semi-interpenetrating network polymers; homopolymers, copolymers, terpolymers and other copolymers including random, statistical, alternating, block and graft copolymers and blends of two or more different polymers. Particular examples of polymers for use in polymer-nanocrystal composites include, but are not limited to polyalkanes, polyhaloalkanes, polyalkenes (e.g., polyacetylene and polydiacetylene) polyalkynes, polyamines (e.g., polyaniline), polyketones, polycarbonates, polyamides, polyimides, polyarylenes (e.g., polyphenylene, polynaphthylene and polyfluorene), polyarylvinylenes (e.g., polyphenylenevinylene and polynaphthylenevinylene), polyheteroarylenes (e.g., polythiophene, polypyrrole), polyheteroarylvinylenes (e.g., polythienylvinylene), polyesters, polyethers, polyurethanes, polybenzimidazoles, polysulfides, polysiloxanes, polysulfones, polysaccharides, polypeptides, polyphosphazenes, polyphosphates, phenolic and phenol-formaldehyde resins, epoxy and phenoxy resins, and urea- and melamine-formaldehyde resins. In a preferred example, the polymer is a conducting polymer. The conducting polymer can be in either a neutral or ionized state. The conducting polymer can be a semiconductor or conductor for holes or electrons.

In one aspect, the nanocrystal-matrix composite comprises an inorganic material as the matrix and the nanocrystals are embedded in the inorganic material. Examples of inorganic materials for use as matrices include, but are not limited to ceramics (e.g., piezoelectric ceramics including but not limited to lead zirconate titanate (PZT)), glass and sol-gels.

In one aspect, the nanocrystal-matrix composite comprises a liquid crystal as the matrix and the nanocrystals are embedded in the liquid crystal.

The nanocrystals of the present invention have useful optical and electronic properties that can be applied in a variety of devices. Examples of devices include, but are not limited to electro-optic devices, such as white light sources, phosphors, light emitting diodes (LED), charge storage devices, photorefractive devices, RF filters, communication and photovoltaic devices, such as those for solar energy conversion, diodes, transistors and the like.

In a device, the nanocrystals can be deposited on a substrate, for example, an electrode, or sandwiched between two or more substrates. Electrodes for use in the present invention can be any material capable of conducting an electrical current. Specific examples include but are not limited to metal electrodes such as Al, Ag, Au, Cu, Ni, Pt, Pd, Co, Cd and Zn. Substrates for use in the present invention include, but are not limited to silicon and other inorganic semiconductors, for example, ZnO, $TiO_2$ and $In_2O_3$—$SnO_2$ (ITO); polymers such as semiconductive polymers, for example, polyphenylenevinylene, and glass, such as patterned ITO-coated glass. For example, the nanocrystals are applied from solution via spin coating. Other known coating methods can be used.

The nanocrystals can be deposited neat or as a mixture comprising the nanocrystals. The mixture further comprises materials that include, but are not limited to electro optical and semiconductive organic and inorganic molecules and polymers. Specific examples of molecules and polymers include, but are not limited to: amines, such as triarylamines and polymers or dendrimers thereof; inorganic semiconductors, such as GaAs, InP and $TiO_2$; polyarylenes, such as polythiophene, polypyrrole, polyphenylene, and polyfluorene; and polyarylvinylenes, such as polyphenylenevinylene and polythienylvinylene.

Nanocrystals are deposited as a single layer or as multilayers. A layer comprises only one type of nanocrystal, for example, II-VI rods. Alternatively, a layer comprises two or more different types of nanocrystals. For example, a layer can comprise two or more different types of nanocrystals. As a non-limiting example of a layer comprising three different types of nanocrystals, a layer comprises II-VI rods, II-VI tetrapods and III-V rods. When nanocrystals are deposited in multilayers, each layer comprises the same type of nanocrystal. Alternatively, when nanocrystals are deposited in multilayers, each layer comprises a different type of nanocrystal. Layer thickness is about 10 nm to about 1000 μm. Preferably, the layer thickness is about 50 μm to about 100 μm. Layer thickness can be measured by any method known to one of ordinary skill in the art, for example, atomic force microscopy (AFM) or scanning electron microscopy (SEM).

The nanocrystals can be oriented on the electrode surface in one direction. Alternatively, the nanocrystals are randomly oriented. The nanocrystals can be oriented by any method known to those of skill in the art. For example, the nanocrystals are oriented under an applied electrical, optical or magnetic field, or the nanocrystals are oriented mechanically by fluid flow orientation.

EXAMPLES

Figure 17A:
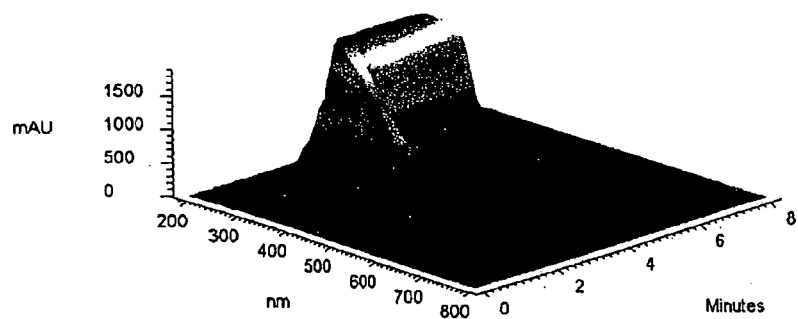
FIGS. 17A-C show chromatograms that demonstrate purification of nanocrystals, according to an embodiment of the present invention.
Figure 17A:
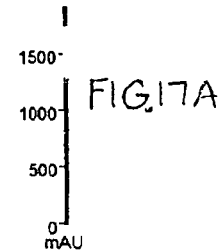
Figure 17B:
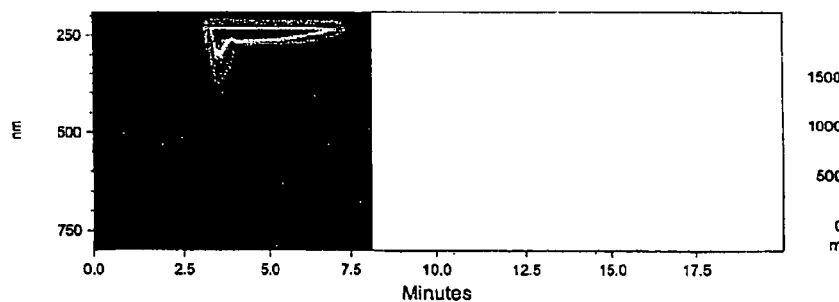
Figure 17B:
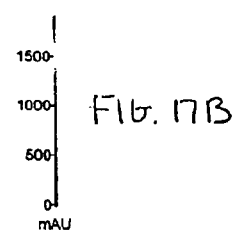
Figure 17C:
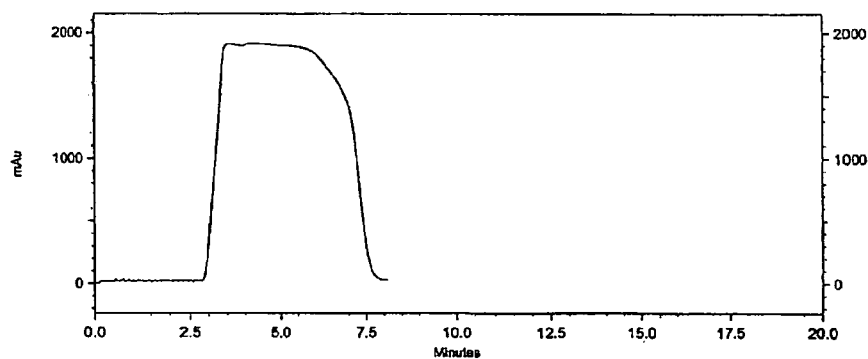

Indium phosphide nanocrystals were synthesized and the product was washed by four successive precipitations with ethanol and methanol. The washed nanocrystals were dissolved in about 2.0 mL of chloroform. An HPLC setup, similar to that shown in FIG. 7, was used for the purification. The mobile phase was about 10% dry, degassed methanol in dry, degassed chloroform. The stationary phase was a reversed-phase $C_{18}$-silica stationary phase. The flow rate was set to about 2 mL/min. The system pressure was about 220 p.s.i. The column height was about 24 mm, and the column width was about 10 mm. A photodiode array was used as the detector. The samples were readily separated into fractions containing almost entirely dissolved nanocrystals and excess solvent and/or surfactant. FIGS. 17A-C show the resulting chromatograms. FIG. 17A shows a 3-D chromatogram and FIGS. 17B-C show the corresponding 2-D chromatograms. Fractions containing the dissolved nanocrystals elute between three and four minutes, while fractions containing only the excess solvent and/or surfactant elute after four minutes. These results show that processing nanocrystal compositions using HPLC can reduce the amount of contaminants, such as excess solvent and/or surfactant, in the nanocrystal compositions and give purified nanocrystal compositions.

After chromatography, the fractions containing the nanocrystals were pooled and methanol was added to precipitate the nanocrystals. The nanocrystals can be redispersed in other solvents, e.g. toluene, for additional analysis, such as nuclear magnetic resonance (NMR) analysis.

CONCLUSION

It will be understood by those skilled in the art that various changes in form and details may be made therein without departing from the spirit and scope of the present invention as defined in the appended claims. Thus, the breadth and scope of the present invention should not be limited by any of the above-described exemplary embodiments, but should be defined only in accordance with the following claims and their equivalents.

What is claimed is:

1. A method of processing nanocrystals, comprising:
 a) providing a mixture comprising nanocrystals, surfactant and a first solvent in which the nanocrystals are soluble, wherein the nanocrystals are soluble in the mixture; and
 b) processing the mixture by chromatography and using chromatography to reduce the amount of surfactant in the mixture, including excess surfactant bound to the nanocrystals;
 wherein the nanocrystals are Group IV, Group II-VI, Group II-VI, Group III-V or Group IV-VI nanocrystals.

2. The method of claim 1, further comprising after (b):
 (c) isolating the nanocrystals from the mixture.

3. The method of claim 2, wherein said step (c) comprises:
 (1) contacting the mixture with a solvent to precipitate said nanocrystals; and
 (2) collecting the precipitated nanocrystals.

4. The method of claim 1, wherein the amount of free surfactant in the mixture is reduced.

5. The method of claim 1, wherein the solvent is free of contaminants.

6. The method of claim 1, wherein the surfactant comprises alkylcarboxylic acids, alkylamines, alkylamine oxides, sulphonates, sulphonic acids, phosphonates and their polymers, phosphonic acids and their polymers, phosphinic acids and their polymers or phosphine oxides and their polymers.

7. The method of claim 1, wherein the using chromatography of step (b) further comprises using chromatography to reduce the amount of contaminant in the mixture, wherein the contaminant comprises one or more nanocrystal precursor, catalyst coordinating solvent, nanocrystal synthesis reaction by product, or impurity.

8. The method of claim 7, wherein the coordinating solvent comprises trioctylamine, trihexylphosphine, trihexylphosphine oxide, trioctylphosphine, trioctylphosphine oxide, tridecylphosphine, tridecylphosphine oxide, tridodecylphosphine, tridodecylphosphine oxide, tritetradecylphosphine, tritetradecylphosphine oxide, trihexadecylphosphine, trihexadecylphosphine oxide, trioctadecylphosphine or trioctadecylphosphine oxide.

9. The method of claim 7, wherein the catalysts comprise gold nanoparticles having diameter of about 1 nm to about 50 nm.

10. The method of claim 1, wherein the surfactant comprises nanocrystal-bound surfactant and free surfactant.

11. The method of claim 1, wherein the surfactant comprises free surfactant in the mixture.

12. The method of claim 1, wherein before said step (b) the nanocrystals comprise a first distribution of sizes.

13. The method of claim 12, wherein after said step (b) the nanocrystals comprise a second distribution of sizes; and
 wherein the second distribution is more narrow than the first distribution.

14. The method of claim 1, wherein said step of using chromatography comprises using size exclusion chromatography (SEC), gel permeation chromatography (GPC), thin layer chromatography (TLC), high performance liquid chromatography (HPLC), reverse phase chromatography, flash chromatography, column chromatography, ion exchange chromatography or electrophoresis.

15. The method of claim 14, wherein said step of using chromatography comprises using size exclusion chromatography.

16. The method of claim 14, wherein said step of using chromatography comprises using reverse phase chromatography.

17. The method of claim 14, wherein said step of using chromatography is repeated until the amount of free surfactant in the nanocrystal mixture is less than about 5% of the total surfactant in the mixture.

18. The method of claim 14, wherein said step of using chromatography is repeated until the amount of free surfactant in the nanocrystal mixture is less than about 1% of the total surfactant in the mixture.

19. The method of claim 14, wherein said step of using chromatography is repeated until the amount of free surfactant in the nanocrystal mixture is less than about 0.1% of the total surfactant in the mixture.

20. The method of claim 1, further comprising before (a):
(1) heating a coordinating solvent mixture;
(2) contacting the solvent mixture with nanocrystal precursor to initiate nucleation of nanocrystals and form a reaction mixture;
(3) heating the reaction mixture to grow the nanocrystals; and
(4) cooling the reaction mixture to stop the growth of nanocrystals.

21. The method of claim 20, further comprising:
precipitating out the nanocrystals selectively by size.

22. The method of claim 1, further comprising:
contacting the mixture with a second solvent having a polarity higher than the first solvent to form a solvent mixture in which the nanocrystals are not soluble; and
isolating the nanocrystals from the solvent mixture.

23. The method of claim 22, further comprising:
redissolving the isolated nanocrystals in a solvent in which the nanocrystals are soluble.

24. The method of claim 23, wherein said contacting, isolating and redissolving steps are repeated until the amount of free surfactant in the nanocrystal mixture is less than about 1% of the total surfactant in the mixture.

25. The method of claim 23, wherein said contacting, isolating and redissolving steps are repeated until the amount of free surfactant in the nanocrystal mixture is less than about 0.1% of the total surfactant in the mixture.

26. The method of claim 23, wherein said contacting, isolating and redissolving steps are repeated until the nanocrystals comprise about a partial monolayer to about a bilayer of bound surfactant.

27. The method of claim 22, wherein said contacting step comprises precipitating the nanocrystals from the solution.

28. The method of claim 22, wherein the second solvent comprises a C1-C4 alcohol.

29. The method of claim 28, wherein said contacting step is performed before said steps (a) and (b).

30. The method of claim 28, wherein said contacting step is performed after said steps (a) and (b).

31. The method of claim 1, further comprising after (b):
contacting the mixture with a base to form an insoluble salt between the base and bound surfactant; and
separating the insoluble salt from the mixture.

32. The method of claim 31, wherein after said separating step, the nanocrystals comprise from about a partial monolayer to a bilayer of bound surfactant.

33. The method of claim 31, wherein the base is selected from the group consisting of pyridine, aniline, bypyridyl, piperidine, imidazole, diethylamine, triethylamine, and di-isopropylamine.

34. The method of claim 31, wherein the separating step comprises:
centrifuging the nanocrystals and insoluble salt, and
decanting the nanocrystals dissolved in solution from a pellet of insoluble salt.

35. The method of claim 31, wherein the separating step comprises filtering the mixture to remove the insoluble salt.

36. The method of claim 1, wherein the nanocrystals and surfactant are soluble in the first solvent.

37. The method of claim 1, wherein the nanocrystals and surfactant have equal or similar solubility in the first solvent.

* * * * *

UNITED STATES PATENT AND TRADEMARK OFFICE
CERTIFICATE OF CORRECTION

| | |
|---|---|
| PATENT NO. | : 7,794,600 B1 |
| APPLICATION NO. | : 11/212488 |
| DATED | : September 14, 2010 |
| INVENTOR(S) | : Buretea et al. |

It is certified that error appears in the above-identified patent and that said Letters Patent is hereby corrected as shown below:

In column 19, line 65, after "surfactant", please insert --,--.
In column 20, line 6, please delete "Group II-VI".

Signed and Sealed this
Twenty-eighth Day of December, 2010

David J. Kappos
*Director of the United States Patent and Trademark Office*